(12) United States Patent
Maeto et al.

(10) Patent No.: US 11,004,468 B2
(45) Date of Patent: May 11, 2021

(54) MAGNETIC DISK DEVICE AND METHOD FOR ADJUSTING WRITE DATA

(71) Applicants: Kabushiki Kaisha Toshiba, Tokyo (JP); Toshiba Electronic Devices & Storage Corporation, Tokyo (JP)

(72) Inventors: Nobuhiro Maeto, Yokohama (JP); Yusuke Tomoda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/808,429

(22) Filed: Mar. 4, 2020

(65) Prior Publication Data
US 2020/0411051 A1    Dec. 31, 2020

(30) Foreign Application Priority Data
Jun. 28, 2019    (JP) .............................. JP2019-121807

(51) Int. Cl.
*G11B 20/12* (2006.01)
*G11B 20/10* (2006.01)
*G11B 27/10* (2006.01)

(52) U.S. Cl.
CPC .... *G11B 20/1258* (2013.01); *G11B 20/10314* (2013.01); *G11B 27/10* (2013.01); *G11B 2020/1278* (2013.01); *G11B 2020/1292* (2013.01)

(58) Field of Classification Search
CPC ....... G11B 27/36; G11B 5/012; G11B 5/6005; G11B 5/59633; G11B 5/59627; G11B 5/5961; G11B 5/09; G11B 5/596; G11B 20/1217; G11B 5/00; G11B 20/1403; G11B 5/54; G11B 20/12; G11B 2005/0005; G11B 2020/1298; G11B 2020/138
USPC .............................. 360/48, 53, 77.02, 51, 75
See application file for complete search history.

(56) References Cited

U.S. PATENT DOCUMENTS

| | | | | |
|---|---|---|---|---|
| 6,469,960 | B1* | 10/2002 | Miyoshi | G11B 7/1267 369/13.05 |
| 6,757,119 | B2* | 6/2004 | Leow | G11B 20/1816 360/31 |
| 7,170,700 | B1* | 1/2007 | Lin | G11B 5/024 360/31 |
| 8,542,454 | B2 | 9/2013 | Hayashi | |
| 8,941,937 | B1* | 1/2015 | Toribio | G11B 20/10361 360/31 |
| 9,030,772 | B2 | 5/2015 | Kim | |
| 9,047,921 | B2* | 6/2015 | Jen | G11B 20/1217 |
| 9,105,279 | B2 | 8/2015 | Shiroishi | |
| 9,111,578 | B1* | 8/2015 | Hassel | G11B 5/012 |
| 9,280,987 | B1* | 3/2016 | Bao | G11B 27/36 |
| 9,466,329 | B1* | 10/2016 | Michel | G11B 20/10222 |

(Continued)

*Primary Examiner* — Nabil Z Hindi
(74) *Attorney, Agent, or Firm* — White & Case LLP

(57) ABSTRACT

According to one embodiment, a magnetic disk device includes a disk, a head which writes data to the disk and reads data from the disk, and a controller which increases a first recording density of data to be written to a first sector having a first overwrite in the first sector and reduces a second recording density of data to be written to a second sector having a second overwrite different from the first overwrite, on a first track of the disk.

15 Claims, 24 Drawing Sheets

(56) References Cited

U.S. PATENT DOCUMENTS 9,805,752 B2 * 10/2017 Yoon ..................... G11B 5/607
10,770,095 B2 * 9/2020 Kashiwagi ............... G11B 5/82

* cited by examiner

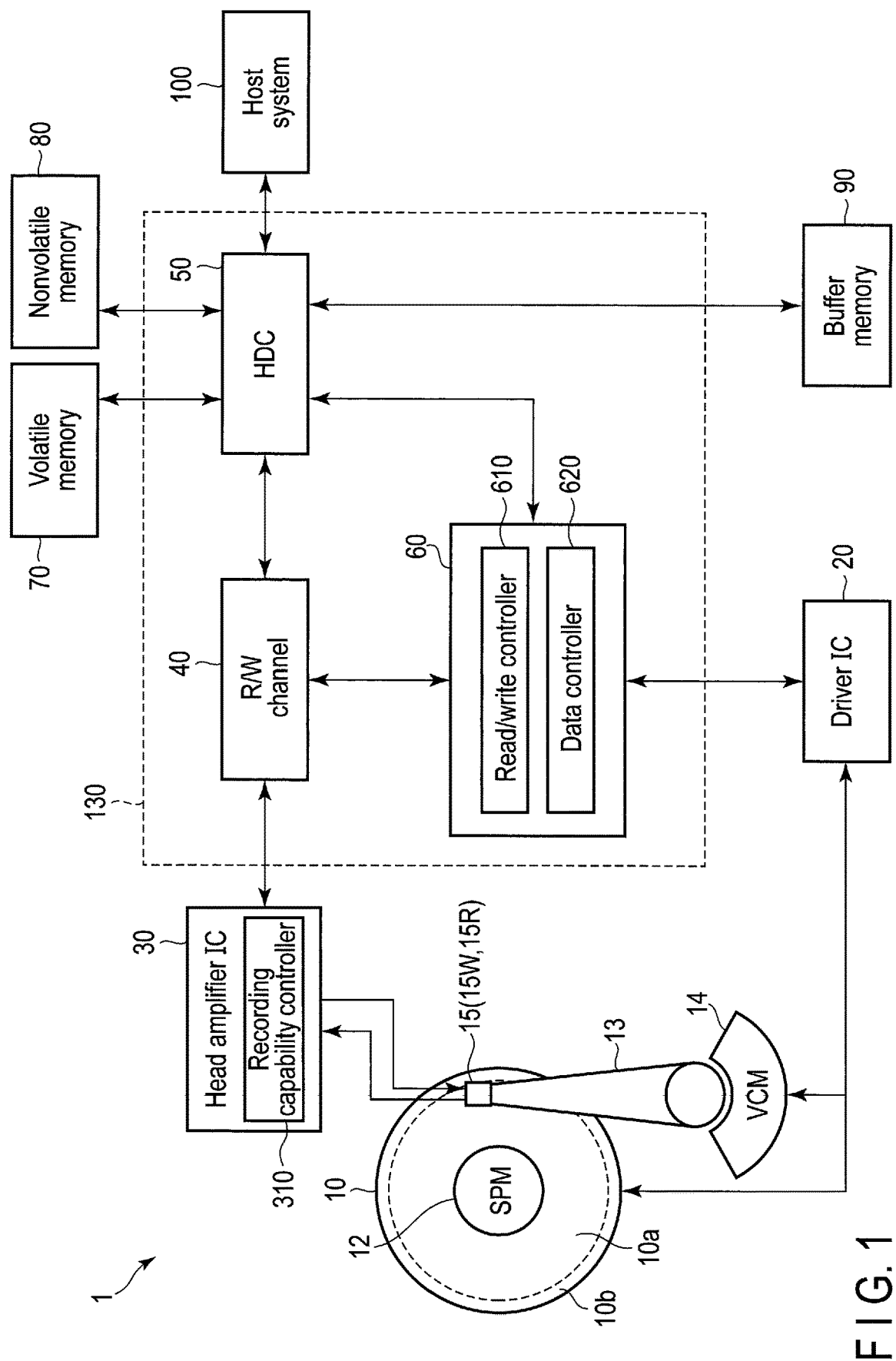
F I G. 1

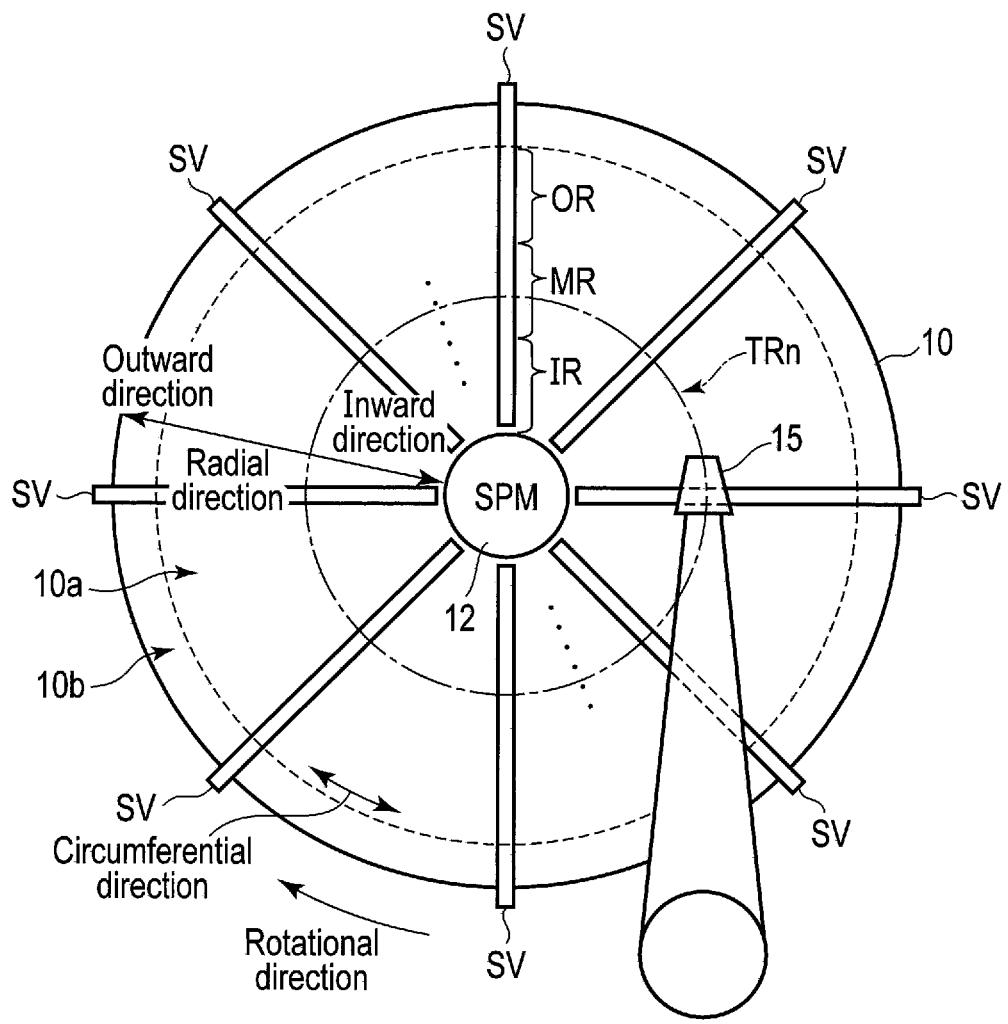
F I G. 2

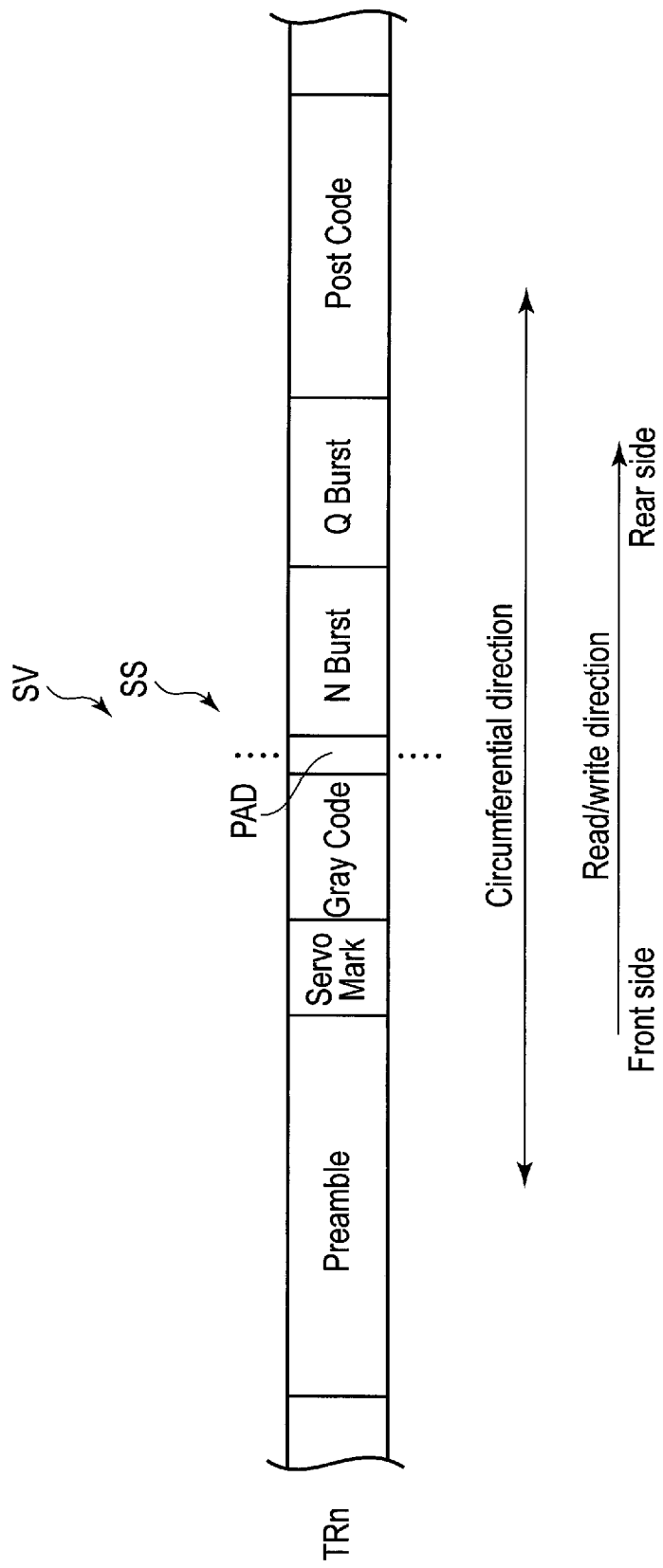
F I G. 3

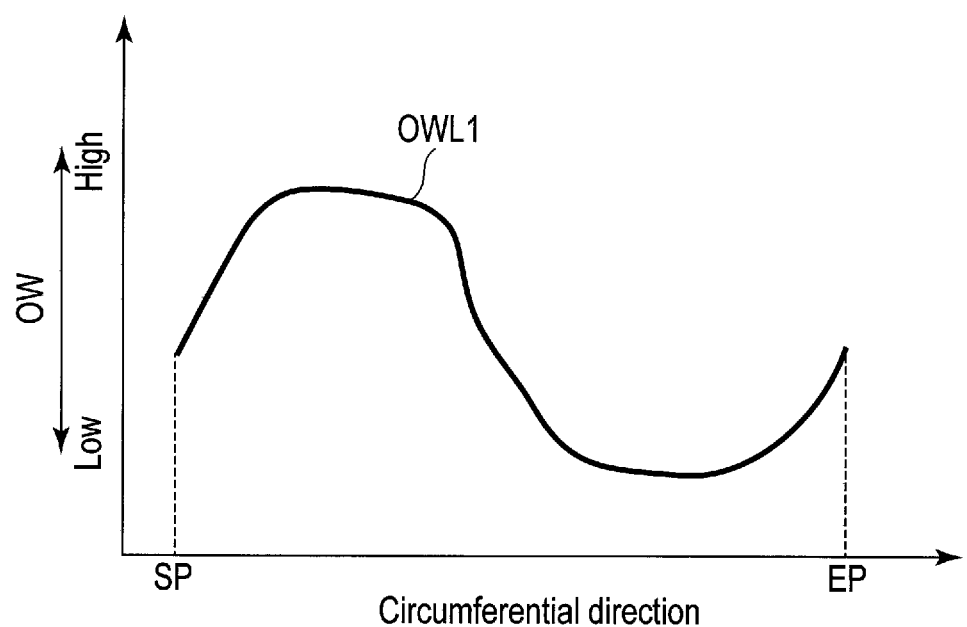
F I G. 10
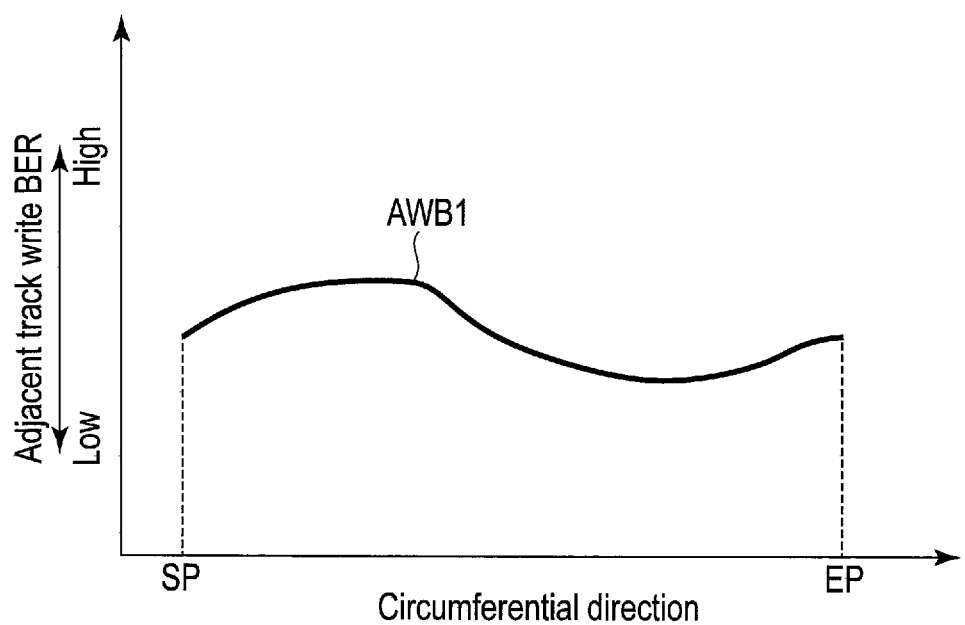
F I G. 11

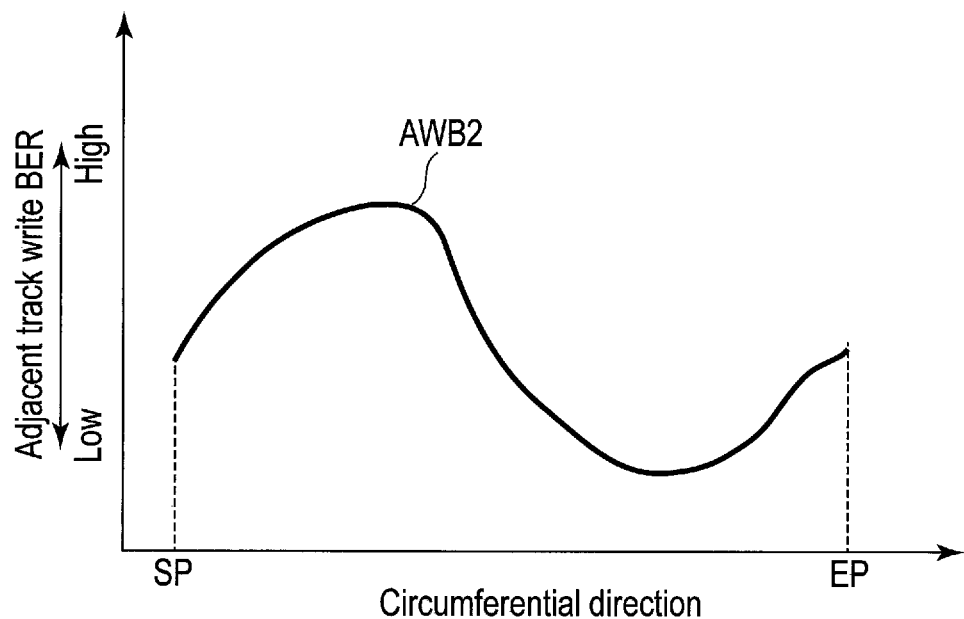
F I G. 12
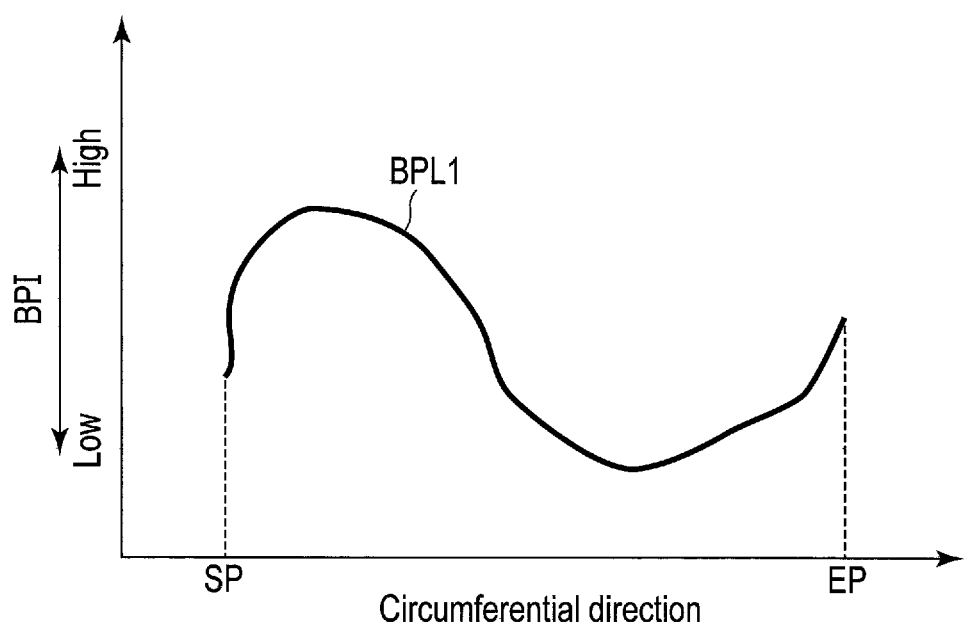
F I G. 13

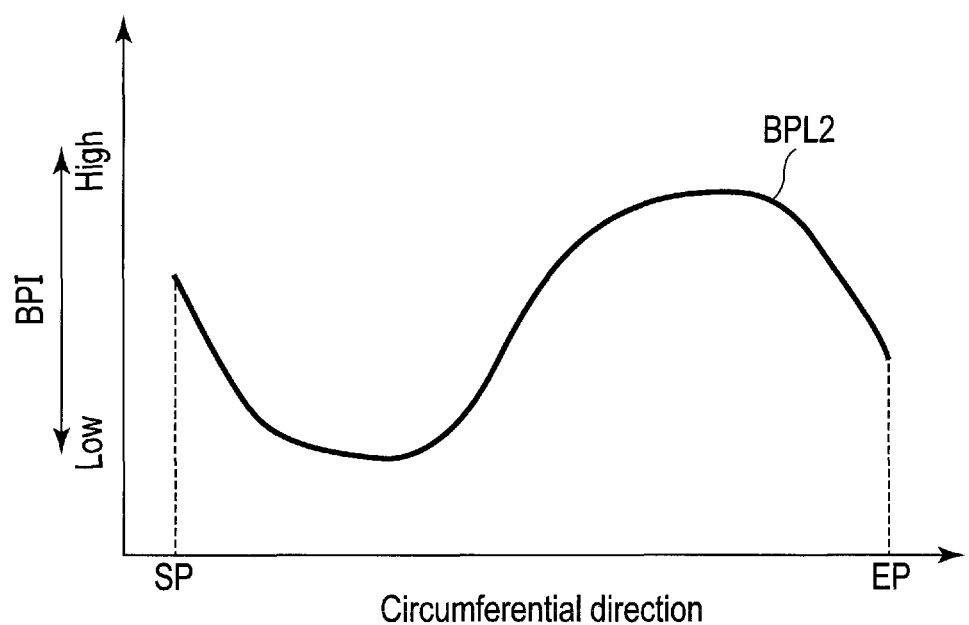
F I G. 16
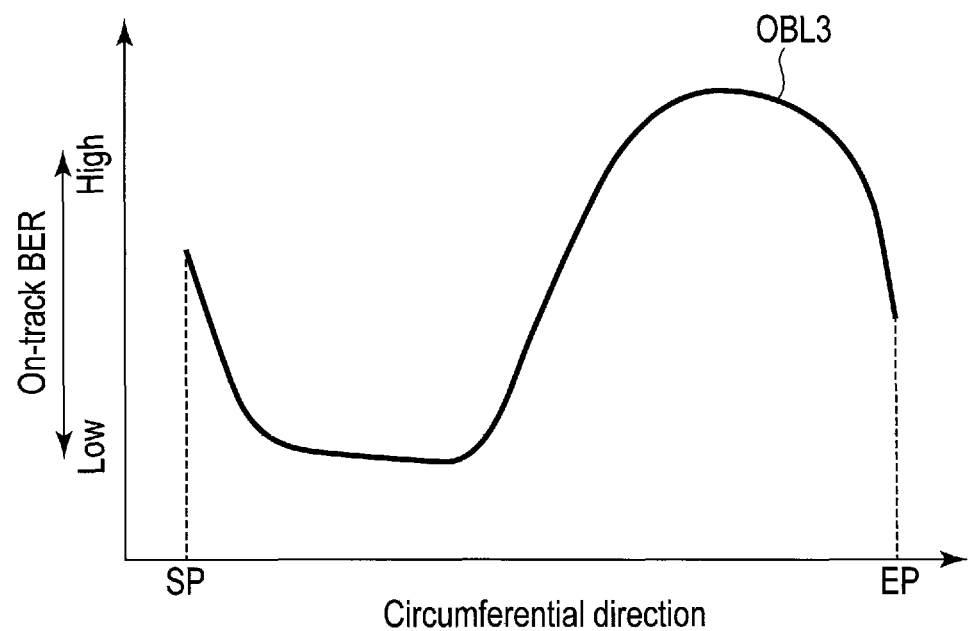
F I G. 17

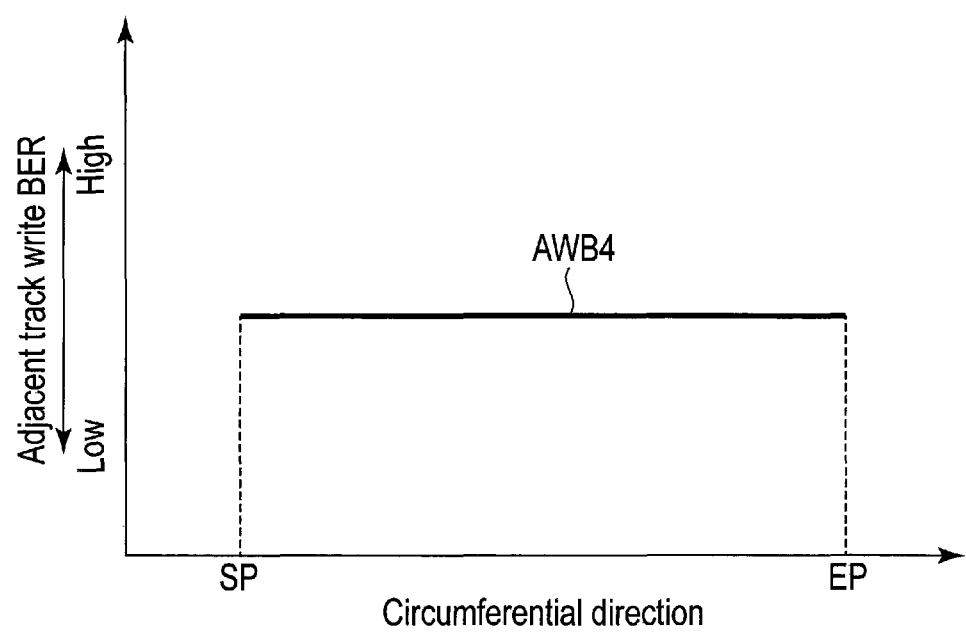
F I G. 18

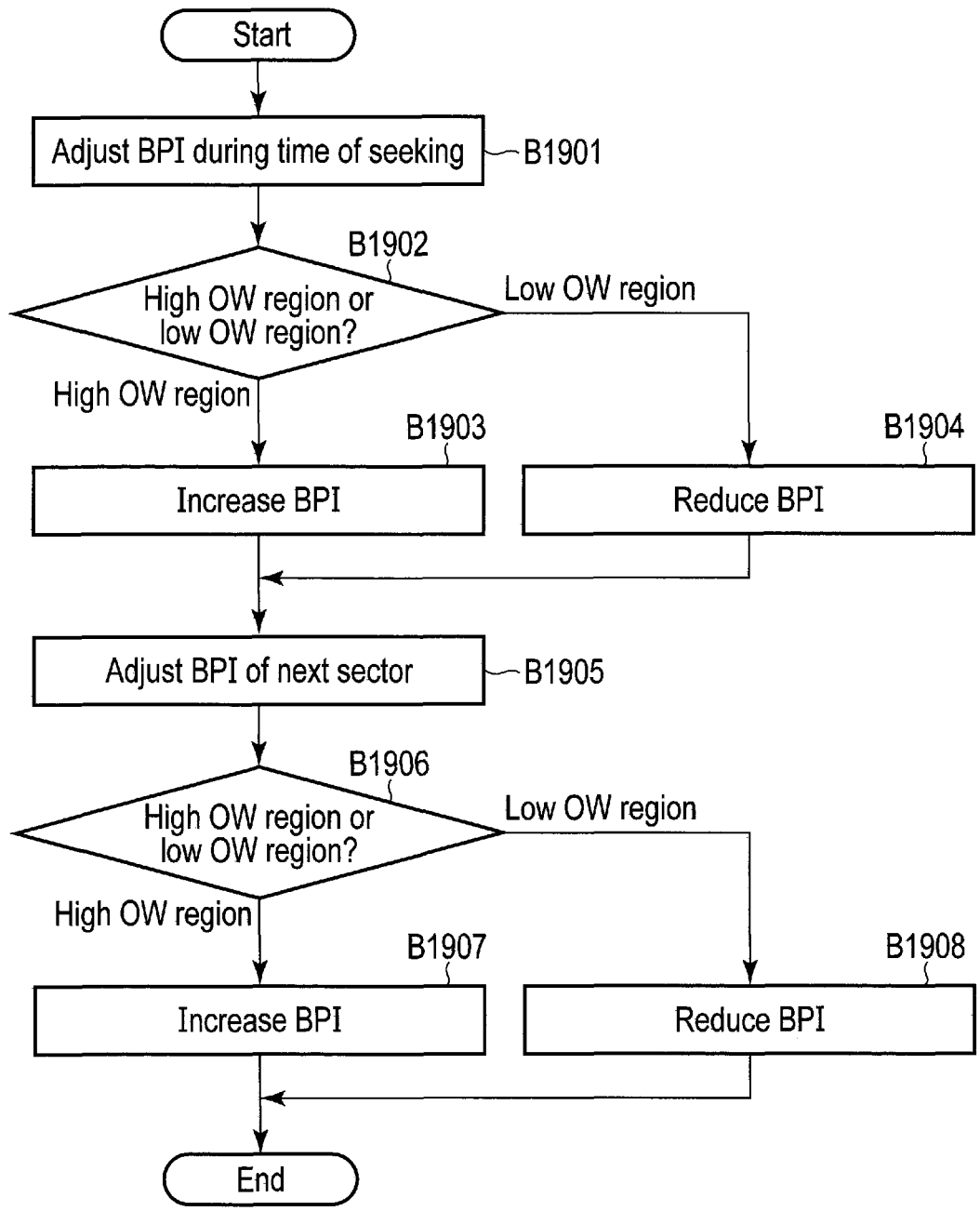
F I G. 19

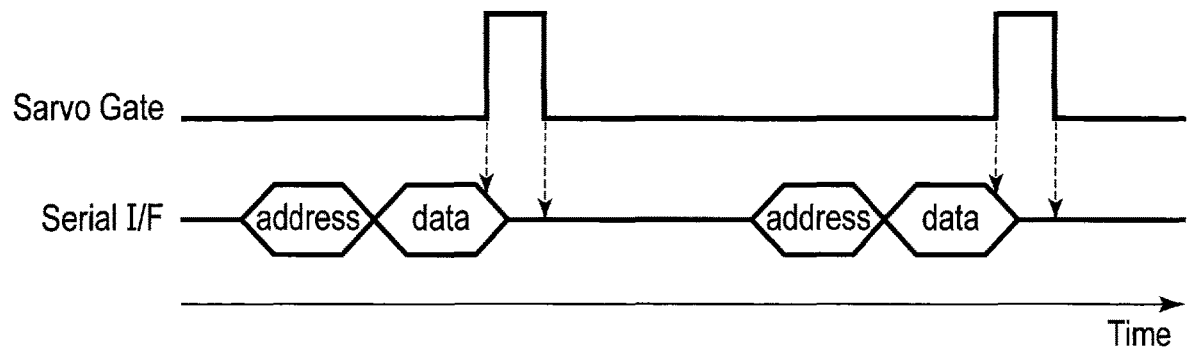
F I G. 21
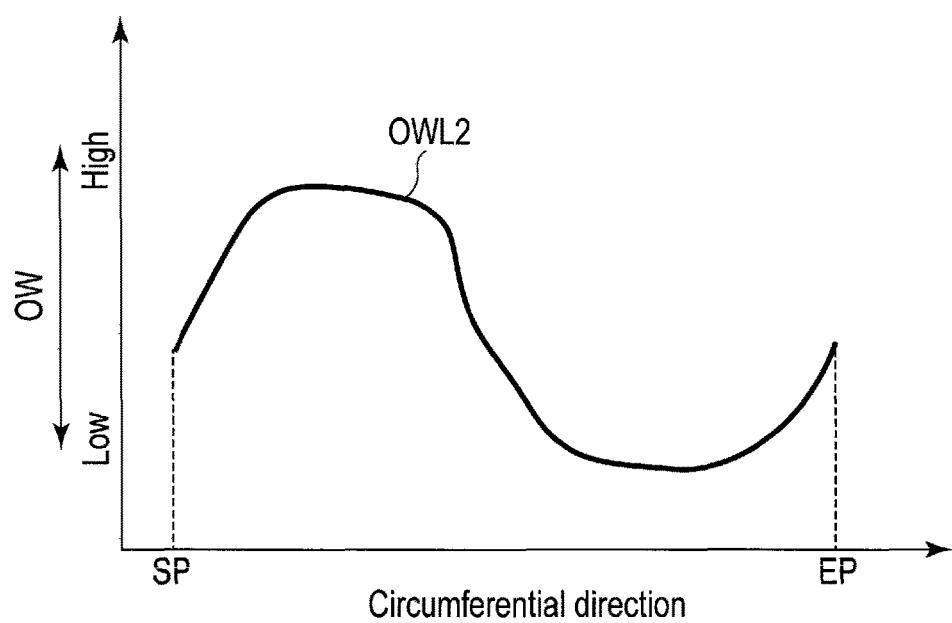
F I G. 22

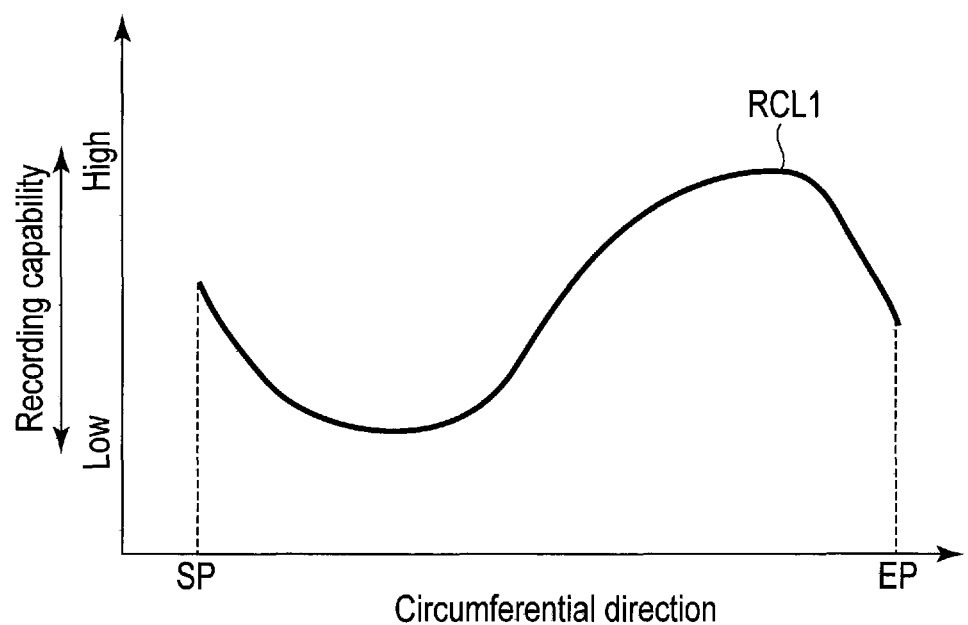
F I G. 23
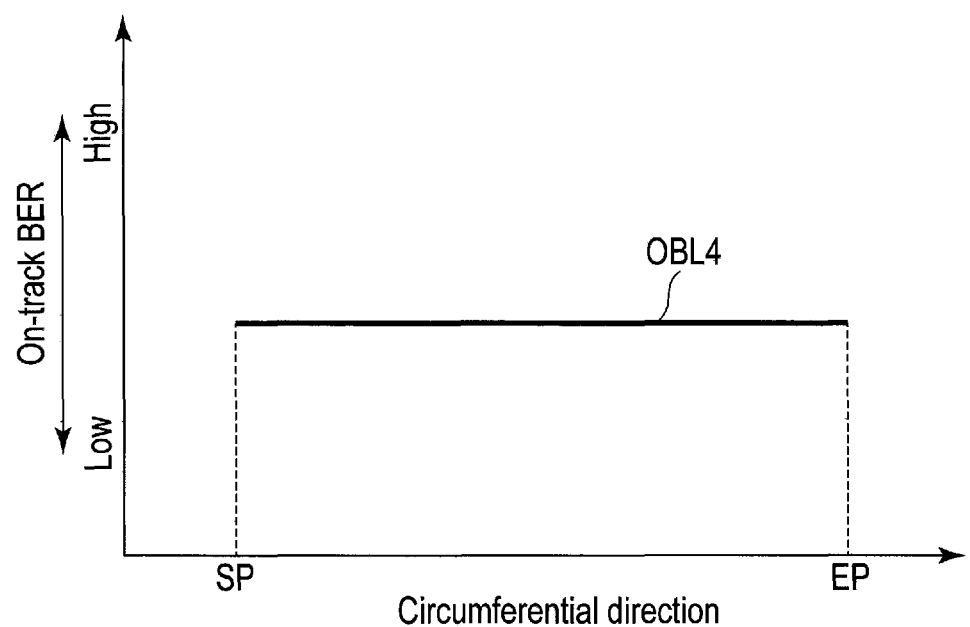
F I G. 24

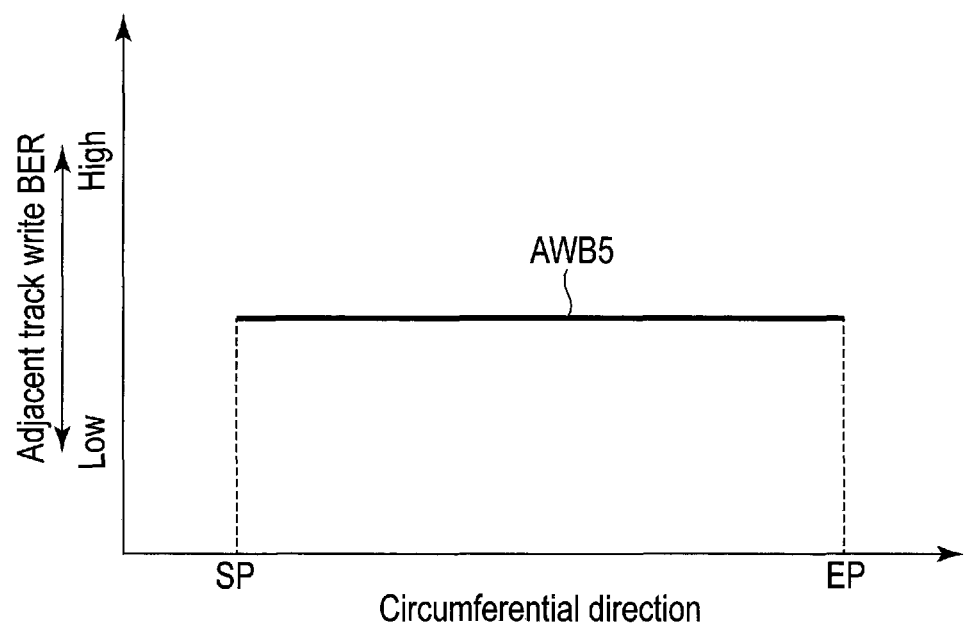
F I G. 25
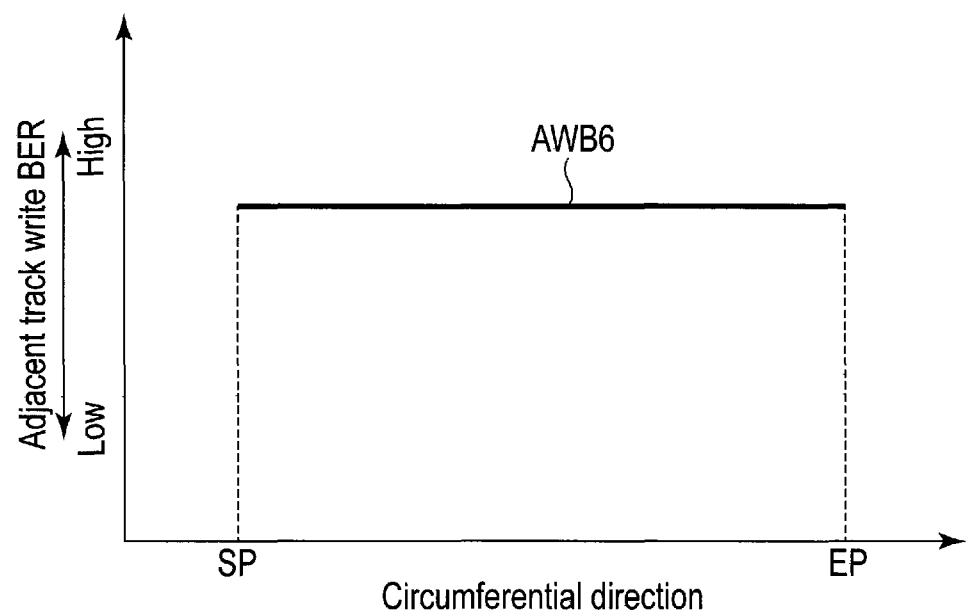
F I G. 26

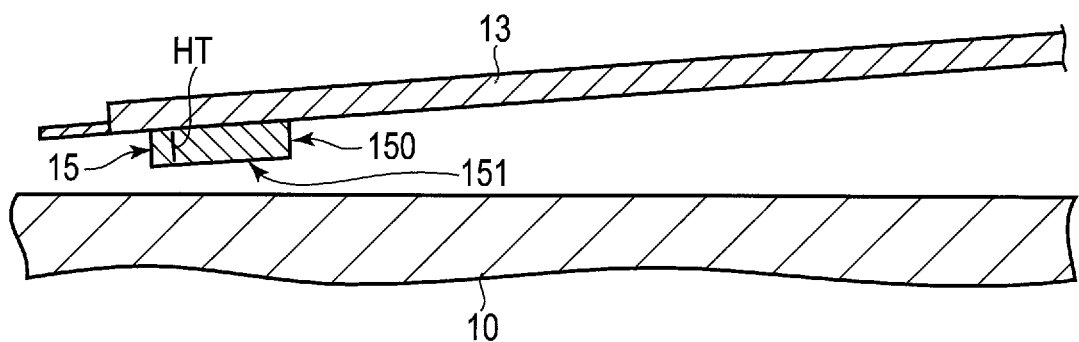
F I G. 28
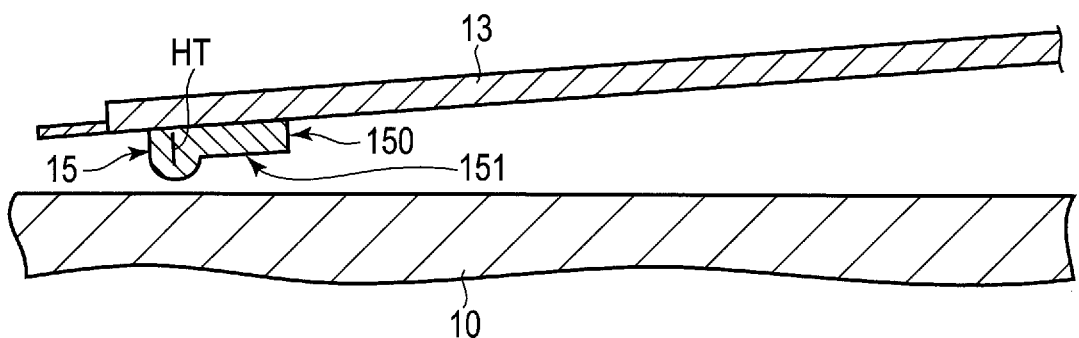
F I G. 29

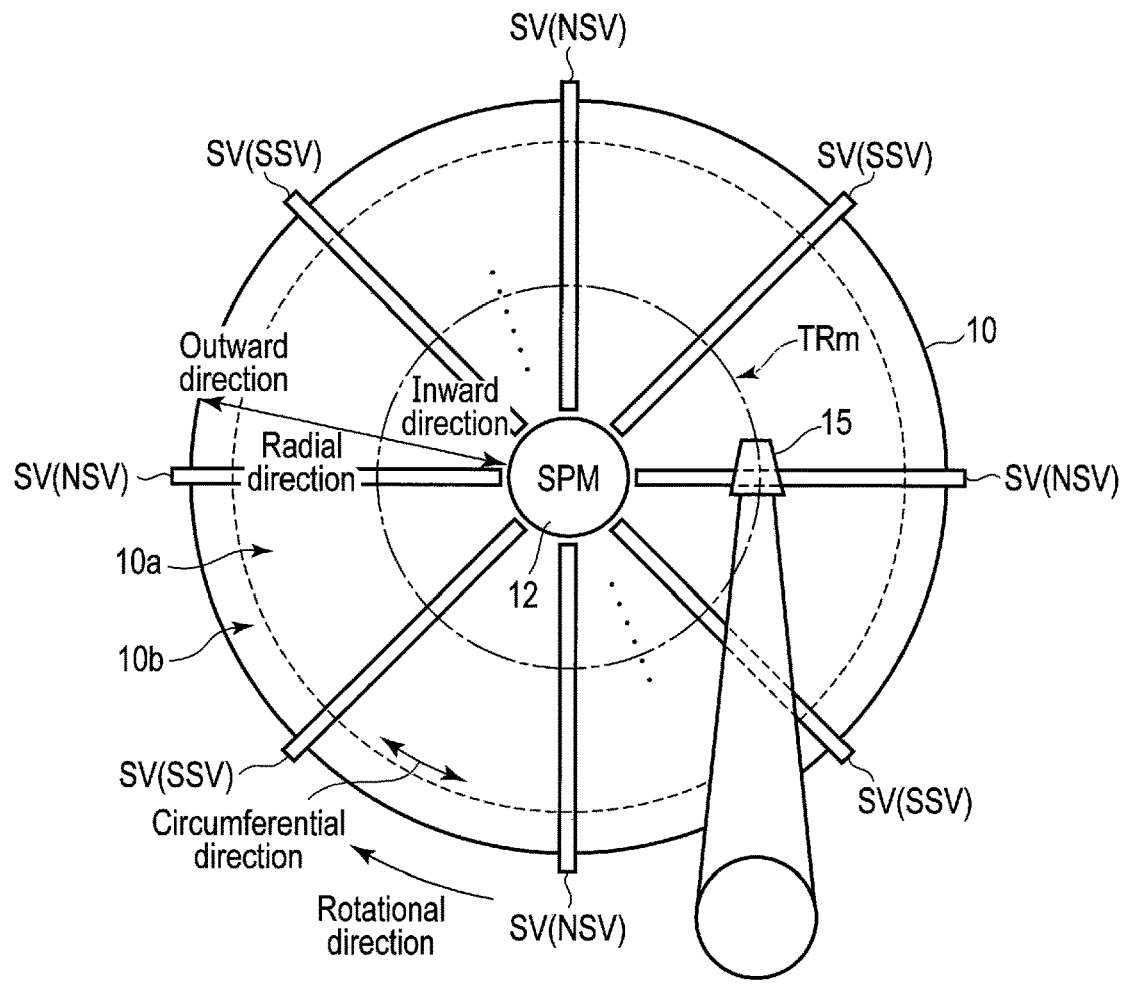
F I G. 30
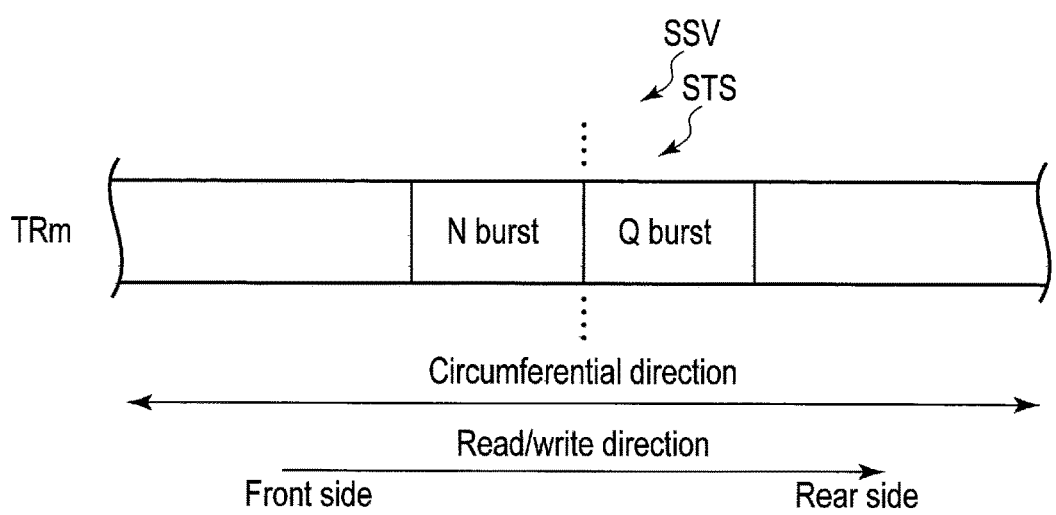
F I G. 31

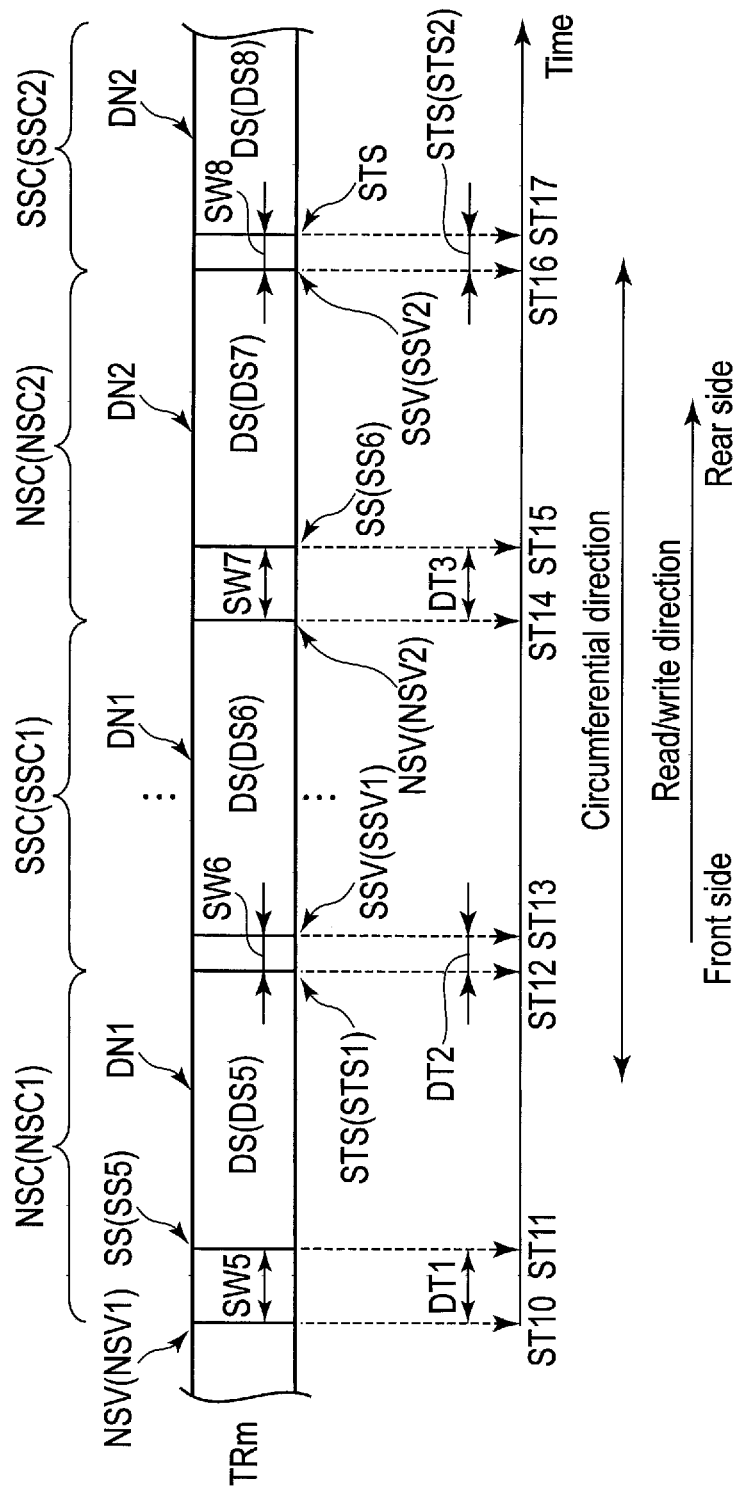
F I G. 32

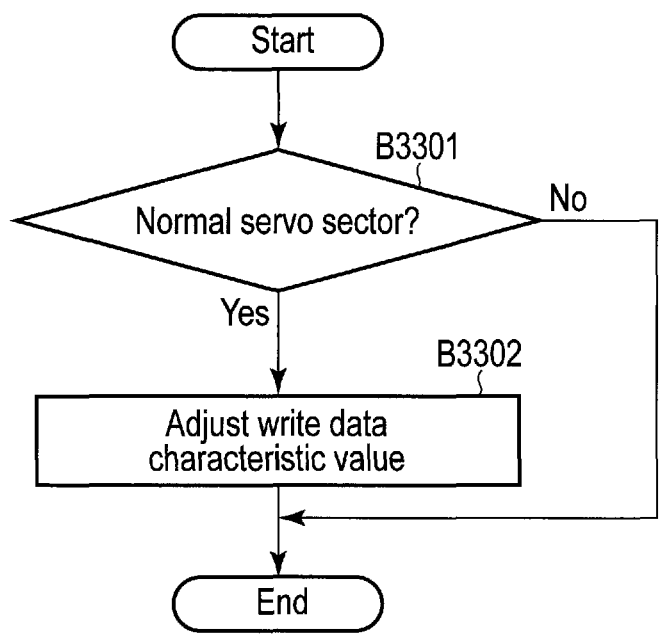
F I G. 33

MAGNETIC DISK DEVICE AND METHOD FOR ADJUSTING WRITE DATA

CROSS-REFERENCE TO RELATED APPLICATIONS

This application is based upon and claims the benefit of priority from Japanese Patent Application No. 2019-121807, filed Jun. 28, 2019, the entire contents of which are incorporated herein by reference.

FIELD

Embodiments described herein relate generally to a magnetic disk device and a write data adjustment method.

BACKGROUND

On a particular track of a magnetic disk of a magnetic disk device (hereinafter referred to simply as a disk), due to nonuniformity in film formation, etc., a bit error rate (BER) may change. The change of the BER on the particular track varies from region to region in the radial direction of the disk. The BER should preferably be constant on each of the tracks arranged in the radial direction of the disk.

BRIEF DESCRIPTION OF THE DRAWINGS

FIG. 1 is a block diagram showing a configuration of a magnetic disk device according to embodiments.

FIG. 2 is a schematic diagram showing an example of arrangement of servo regions according to the first embodiment.

FIG. 3 is a schematic diagram showing an example of a configuration of a servo sector according to the first embodiment.

FIG. 10 is an illustration showing an example of a change of an overwrite (OW) corresponding to FIG. 9.

FIG. 11 is an illustration showing an example of a change of an adjacent track write BER corresponding to FIG. 9.

FIG. 12 is an illustration showing an example of a change of an adjacent track write BER corresponding to FIG. 9.

FIG. 13 is an illustration showing an example of a change of an adjustment BPI on a track corresponding to the change of the on-track BER of FIG. 9.

FIG. 16 is an illustration showing an example of a change of an adjustment BPI on a track corresponding to the change of the on-track BER of FIG. 9.

FIG. 17 is an illustration showing an example of a change of an on-track BER in a case where data is written to the track of FIG. 9 based on the change of the BPI of FIG. 16.

FIG. 18 is an illustration showing an example of a change of an adjacent track write BER in a case where data is written to an adjacent track of the track of FIG. 9 which is written based on the change of the BPI of FIG. 16.

FIG. 19 is a flowchart showing an example of a BPI adjustment method according to the first embodiment.

FIG. 21 is an illustration showing an example of a timing for changing a recording capability.

FIG. 22 is an illustration showing an example of a change of an overwrite according to a modification example 1.

FIG. 23 is an illustration showing an example of a change of a recording capability which is adjusted on a track corresponding to the change of the overwrite of FIG. 22.

FIG. 24 is an illustration showing an example of a change of an on-track BER in a case where data is written to a track of FIG. 23 based on the change of the overwrite of FIG. 22.

FIG. 25 is an illustration showing an example of a change of an adjacent track write BER in a case where data is written to an adjacent track of the track of FIG. 23 which is written based on the change of the overwrite of FIG. 22.

FIG. 26 is an illustration showing an example of a change of an adjacent track write BER in a case where data is written to an adjacent track of the track of FIG. 23 which is written based on the change of the overwrite of FIG. 22.

FIG. 28 is an illustration showing an example of a non-projecting head.

FIG. 29 is an illustration showing an example of a projecting head.

FIG. 30 is a schematic diagram showing an example of arrangement of normal servos and short servos according to the second embodiment.

FIG. 31 is a schematic diagram showing an example of a configuration of a short servo sector according to the second embodiment.

FIG. 32 is an illustration showing an example of a write characteristic value adjustment process according to the second embodiment.

FIG. 33 is a flowchart showing an example of the write characteristic value adjustment process according to the second embodiment.

DETAILED DESCRIPTION

Figure 4:
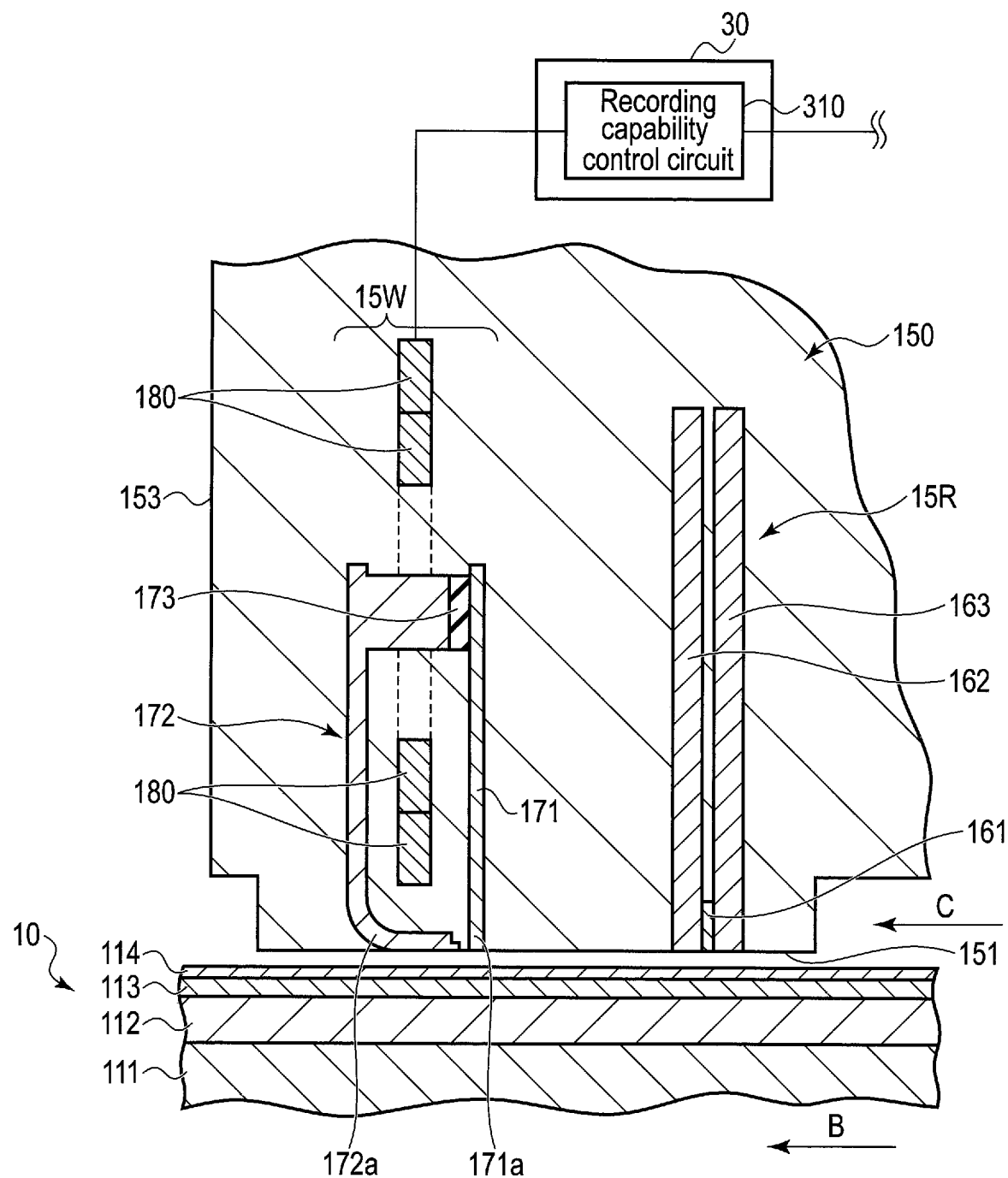
FIG. 4 is an enlarged cross-sectional diagram showing an example of a disk and a head.

In general, according to one embodiment, a magnetic disk device comprises a disk; a head which writes data to the disk and reads data from the disk; and a controller which increases a first recording density of data to be written to a first sector having a first overwrite in the first sector and reduces a second recording density of data to be written to a second sector having a second overwrite different from the first overwrite, on a first track of the disk.

Embodiments will be described hereinafter with reference to the accompanying drawings. Note that drawings are presented by way of example only and are not intended to limit the scope of inventions.

First Embodiment

FIG. 1 is a block diagram showing a configuration of a magnetic disk device 1 according to the first embodiment.

The magnetic disk device 1 includes a head-disk assembly (HDA) which will be described later, and a driver IC 20, a head amplifier integrated circuit (hereinafter referred to as a head amplifier IC or preamplifier) 30, a volatile memory 70, a nonvolatile memory 80, a buffer memory (buffer) 90, and a system controller 130 which is a single-chip integrated circuit. In addition, the magnetic disk device 1 is connected to a host system (hereinafter referred to simply as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is mounted in the SPM 12, and is rotated by the drive of SPM 12. The arm 13 and the VCM 14 constitute an actuator. The actuator moves and controls the head 15 mounted on the arm 13 to a particular position of the disk 10 by the drive of VCM 14. Note that two or more disks 10 and two or more heads 15 may be provided.

On the disk 10, a user data region 10a which is accessible from a user and a system area 10b to which information necessary for system management is written are allocated in a region in which data can be written. In the following, a direction orthogonal to the radial direction of the disk 10 will be referred to as a circumferential direction. In addition, a particular position in the radial direction of the disk 10 may be referred to as a radial position, and a particular position in the circumferential direction of the disk 10 may be referred to as a circumferential position. Furthermore, the radial position and the circumferential position may be referred to collectively and simply as a position.

The head 15 comprises a slider as a main body, and a write head 15W and a read head 15R which are mounted on the slider. The write head 15W writes data to the disk 10. The read head 15R reads data recorded on the disk 10. In some cases, the write head 15W may be referred to simply as a head 15, the read head 15R may be referred to simply as a head 15, or the write head 15W and the read head 15R may be referred to collectively as a head 15. In other cases, a central portion of the head 15 may be referred to as a head 15, a central portion of the write head 15W may be referred to as a write head 15W, and a central portion of the read head 15R may be referred to as a read head 15R. The term "track" is used as one region of a plurality of regions divided in the radial direction of the disk 10, data extending in the circumferential direction of the disk 10, or data written to the track, or may be used in various other senses. The term "sector" is used as one region of a plurality of regions divided in the circumferential direction of the track, data written to a particular position of the disk 10, or data written to the sector, or may be used in various other senses. The width in the radial direction of the track is referred to as a track width, and the central position in the track width is referred to as a track center. In the following, data written to the disk 10 will be referred to as write data, and data read from the disk 10 will be referred to as read data. The write data may be referred to simply as data, the read data may be referred to simply as data, or the write data and the read data may be referred to as data. In the following, "to write data to the disk 10", "to read data from the disk 10" and the like may be referred to as "to access".

FIG. 2 is a schematic diagram showing an example of arrangement of servo regions SV according to the first embodiment. As shown in FIG. 2, with regard to the radial direction, a direction toward the outer circumference of the disk 10 is referred to as an outward direction (outside), and an opposite direction from the outward direction will be referred to as an inward direction (inside). In addition, FIG. 2 shows a rotational direction of the disk 10. Note that the rotation direction may be an opposite direction. In FIG. 2, the user data region 10a is divided into an inner circumferential region IR located in the inward direction, an outer circumferential region OR located in the outward direction, and a middle circumferential region MR located between the inner circumferential region IR and the outer circumferential region OR.

The disk 10 includes a plurality of tracks arranged in the radial direction. The tracks correspond to circular paths, respectively. For example, the tracks are concentrically arranged with respect to the disk 10. Note that the tracks may not have a circular shape but may have, for example, a wave shape which oscillates in the radial direction. In addition, the tracks may not be concentrically arranged with respect to the disk 10. In the example shown in FIG. 2, the disk 10 includes a track TRn. The track TRn is concentrically arranged with respect to the disk 10. In the example shown in FIG. 2, the track TRn is located in the middle circumferential region MR. Note that the track TRn may not have a circular shape. The track TRn may not be concentrically arranged with respect to the disk 10. In addition, the track TRn may be located in the inner circumferential region IR or may be located in the outer circumferential region OR.

The disk 10 has a plurality of servo regions SV. The servo regions SV radially extend in the radial direction of the disk 10 over a plurality of tracks, and are discretely arranged and spaced apart from one another by a particular space in the circumferential direction. Each servo region SV includes a plurality of servo sectors. Between two servo regions SV which are successively arranged in the circumferential direction, there is a region to which user data, etc. is written. In the following, a region to which user data is written between two servo regions SV may be referred to as a data region. In some cases, a region to which user data is written between two servo sectors on a particular track may also be referred to as a data portion. In other cases, a servo sector and a data portion subsequent to the servo sector may be referred to as collectively as a sector.

FIG. 3 is a schematic diagram showing an example of a configuration of a servo sector SS according to the present embodiment. FIG. 3 shows a particular servo sector SS written to a particular track TRn. The servo sector SS corresponds to a part of a servo region SV corresponding to the particular track. As shown in FIG. 3, with regard to the circumferential direction, a direction in which data is read/written will be referred to as a read/write direction. The read/write direction corresponds to, for example, the opposite direction from the rotational direction shown in FIG. 2. The read/write direction indicates a direction from the front side to the rear side. The front side corresponds to a forward direction in terms of time, and the rear side corresponds to a backward direction in terms of time. In the following, the front side may be referred to simply as before, and the rear side may be referred to as after.

The servo sector SS includes servo data, for example, preamble, servo mark, gray code, PAD, burst data and post code. Note that the servo sector SS may not include the post code. The preamble, the servo mark, the gray code, the PDA, the burst data and the post code are successively arranged toward the pointing end of an arrow indicating the read/write direction in this order. The preamble includes preamble information for synchronizing with a reproduction signal having a servo pattern composed of servo mark, gray code and the like. The servo mark includes servo mark information indicating the start of the servo pattern. The gray code is composed of the address (cylinder address) of the particular track and the address of the servo sector of the particular track. The burst data is data (relative position data) used for detecting a position deviation (position error) in the radial direction and/or circumferential direction of the head 15 with respect to the track center of the particular track, and is composed of a repetitive pattern having a particular period. The PAD includes PAD information of a synchronous signal such as gap and servo AGC. The burst data includes, for example, N burst and Q burst. The post code includes data (hereinafter referred to as RRO correction data) for correcting an error which results from distortion of the track with respect to the track center (target path) which is concentric with respect to the disk 10 which results from deflection (repetitive run-out: RRO) which synchronizes with rotation of the disk 10 at a time when servo data is written to the disk, and the like.

FIG. 4 is an enlarged cross-sectional diagram showing an example of the disk 10 and the head 15. In the following, a direction from the head 15 toward the disk 10 will be referred to as a downward direction, and a direction from the disk 10 toward the head 15 will be referred to as an upward direction. In FIG. 3, a rotational direction B of the disk 10 and a direction of an airflow C coincide with each other.

In the example illustrated, a substrate 111, a soft magnetic layer 112, a magnetic recording layer 113 and a protective layer 114 are stacked in this order in the disk 10. The substrate 111 is formed of a disk-shaped nonmagnetic material. The soft magnetic layer 112 is formed of a material exhibiting soft magnetic characteristics above the substrate 111. The magnetic recording layer 113 has magnetic anisotropy in a direction perpendicular to the surface of the disk 10 above the soft magnetic layer 112. The protective layer 114 is formed above the magnetic recording layer 113.

In the example illustrated, the head 15 includes a slider 150. The slider 150 is formed of, for example, a sintered body of alumina and titanium carbide (AlTiC). The slider 150 has a disk-facing surface (air bearing surface (ABS)) 151 facing the surface of the disk 10, and a trailing end 153 located at the outflow side of the airflow C. The read head 15R and the write head 15W are partially exposed at the disk-facing surface 151.

The read head 15R is formed of a magnetic film 161, a shield film 162 and a shield film 163. The magnetic film 161 is located between the shield film 162 and the shield film 163 and produces magnetoresistance. The shield film 162 is located on the trailing end 153 side with respect to the magnetic film 161. The shield film 163 faces the shield film 162. The lower ends of the magnetic film 161, the shield film 162 and the shield film 163 are exposed at the disk-facing surface 151, respectively.

The write head 15W is provided on the trailing end 153 side of the slider 150 with respect to the read head 15R. The write head 15W includes a main magnetic pole 171, a trailing shield (write shield) 172, and a recording coil 180 arranged in such a manner that the recording coil 180 winds around a magnetic circuit including the main magnetic pole 171 and the write shield 172 for the purpose of passing magnetic flux through the main magnetic pole 171.

The main magnetic pole 171 is formed of a soft magnetic material having high saturation magnetic flux density. The main magnetic pole 171 generates a recording magnetic field in a direction perpendicular to the surface of the disk 10 for magnetizing the magnetic recording layer 113 of the disk 10. In the example illustrated, the main magnetic pole 171 extends substantially perpendicularly to the disk-facing surface 151. The lower surface of an end portion 171a on the disk-facing surface 151 side of the main magnetic pole 171 is exposed at the disk-facing surface 151. The end portion 171a of the main magnetic pole 171 is narrowed and tapered down toward the disk-facing surface 151, and has a columnar shape narrower than the other portion. The width in a cross-track direction of the end portion 171a of the main magnetic pole 171 substantially corresponds to the track width of a track. The cross-track direction is, for example, a direction parallel to the radial direction.

The write shield 172 is formed of a soft magnetic material having high saturation magnetic flux density. The write shield 172 is provided for efficiently closing a flux path via the soft magnetic layer 112 located directly below the main magnetic pole 171. The write shield 172 is located on the trailing end 153 side with respect to the main magnetic pole 171. The write shield 172 is connected to the main magnetic pole 171 via an insulating material 173. The main magnetic pole 171 and the write shield 172 are electrically insulated from each other and constitute a magnetic circuit. The write shield 172 is substantially L-shaped and has an end portion 172a facing the end portion 171a of the main magnetic pole 171 across a write gap. The lower surface of the end portion 172a is exposed at the ABS 151 of the slider 150.

The recording coil 180 is provided in such a manner that the recording coil 180 winds around the magnetic circuit including the main magnetic pole 171 and the write shield 172 for the purpose of passing magnetic flux through the main magnetic pole 171. The recording coil 180 is provided, for example, between the main magnetic pole 171 and the write shield 172. When a current having a particular size (referred to also as a recording current, a write current or a recording capability) is supplied to the recording coil 180, a recording magnetic field is excited in the main magnetic pole 171 and the write shield 172. As a result, the main magnetic pole 171 and the write shield 172 are magnetized. By using magnetic flux passing through the magnetized main magnetic pole 171 and the magnetized write shield 172, the magnetization direction of a recording bit of the magnetic recording layer 113 of the disk 10 is changed, and a magnetic pattern according to the recording capability is recorded on the disk 10. Note that the recording capability includes recording current (Iw), overshoot, 1T boost of pattern dependent write, high frequency assisted recording type bias voltage, heat-assisted recording type bias voltage, and the like. In the following, the recording capability may be used as, for example, recording current.

The driver IC 20 controls the drive of the SPM 12 and the drive of the VCM 14 according to the control of the system controller 130 (more specifically, an MPU 60 which will be described later).

The head amplifier IC (preamplifier) 30 includes a read amplifier and a write driver, for example, a recording capability controller 310. The read amplifier amplifies a read signal which is read from the disk 10, and outputs it to the system controller 130 (more specifically, a read/write (R/W) channel 40 which will be described later). The recording capability controller 310 is electrically connected to the write head 15W, and supplies a recording capability corresponding to write data output from the R/W channel 40 to the write head 15W. In one example, the recording capability controller 310 is electrically connected to the recording coil 180, and supplies a recording capability corresponding to write data output from the R/W channel 40 to the recording coil 180. The recording capability controller 310 supplies the recording capability to the write head 15W according to the control of the system controller 130, for example, the MPU 60. For example, the recording capability controller 310 supplies the recording capability to the recording coil 180 according to the control of the MPU 60.

The volatile memory 70 is a semiconductor memory which loses stored data disappears when supply of power is cut off. The volatile memory 70 stores data, etc. necessary for the process of each unit of the magnetic disk device 1. The volatile memory 70 is, for example, a dynamic random access memory (DRAM) or a synchronous dynamic random access memory (SDRAM).

The nonvolatile memory 80 is a semiconductor memory which still maintains stored data even if supply of power is cut off. The nonvolatile memory 80 is, for example, a NOR type or NAND type flash read only memory (FROM).

The buffer memory 90 is a semiconductor memory which temporarily maintains data transmitted and received between the magnetic disk device 1 and the host 100. Note that the buffer memory 90 may be integrally formed with the volatile memory 70. The buffer memory 90 is, for example, a DRAM, a static random access memory (SRAM), a ferroelectric random access memory (FeRAM), a magnetoresistive random access memory (MRAM) or the like.

The system controller (controller) 130 is realized using, for example, a large-scale integrated circuit (LSI) called a system-on-a-chip (SoC) in which a plurality of elements are integrated on a single chip. The system controller 130 includes the read/write (R/W) channel 40, a hard disk controller (HDC) 50 and the microprocessor (MPU) 60. The system controller 130 is electrically connected to, for example, the driver IC 20, the head amplifier IC 30, the nonvolatile memory 70, the nonvolatile memory 80, the buffer memory 90 and the host 100.

The R/W channel 40 executes signal processing of read data transferred from the disk 10 to the host 100 and write data transferred from the host 100 according to an instruction from the MPU 60 which will be described later. The R/W channel 40 has a circuit or a function for measuring the signal quality of read data. The R/W channel 40 is electrically connected to, for example, the head amplifier IC 30, the HDC 50, the MPU 60, and the like.

The HDC 50 controls data transfer between the host 100 and the R/W channel 40 according to an instruction from the MPU 60 which will be described later. The HDC 50 is electrically connected to, for example, the R/W channel 40, the MPU 60, the volatile memory 70, the nonvolatile memory 80, the buffer memory 90, and the like.

The MPU 60 is a main controller which controls each unit of the magnetic disk device 1. The MPU 60 controls the VCM 14 via the driver IC 20 and executes servo control for positioning the head 15. In addition, the MPU 60 controls the SPM 12 via the driver IC 20 and rotates the disk 10. The MPU 60 controls an operation of writing data to the disk 10 and selects a storage destination of write data. In addition, the MPU 60 controls an operation of reading data from the disk 10 and controls processing of read data. The MPU 60 is connected to each unit of the magnetic disk device 1. The MPU 60 is electrically connected to, for example, the driver IC 20, the R/W channel 40, the HDC 50, and the like.

The MPU 60 includes a read/write controller 610 and a data controller 620. The MPU 60 executes processes of these units such as the read/write controller 610 and the data controller 620 on firmware. Note that the MPU 60 may include these units such as the read/write controller 610 and the data controller 620 as circuits.

The read/write controller 610 controls a read process and a write process of data according to a command from the host 100. The read/write controller 610 controls the VCM 14 via the driver IC 20, positions the head 15 at a particular position, and reads or writes data.

The data controller 620 controls data, for example, write data and read data. Based on the write characteristic of a particular recording region, for example, a zone, a track or a sector of the disk 10, the data controller 620 controls the characteristic value of data to be written to the recording region (hereinafter referred to as a write data characteristic value). The zone corresponds to a plurality of regions divided in the radial direction of the disk 10. The zone includes a plurality of tracks. The write data characteristic value may be referred to simply as write data. The write data characteristic value may also mean the frequency of a signal corresponding to the write data characteristic value.

Based on the write characteristic, for example, the error rate (bit error rate: BER) of a particular recording region, for example, a zone, a track or a sector of the disk 10, the data controller 620 controls the write data characteristic value, for example, the recording density (bits per inch: BPI) of data to be written to the recording region. In the following, for the sake of convenience of explanation, "the BER of data written to the particular region" may be referred to simply as "the BER of the particular recording region" and "the BPI of data to be written to the particular recording region" may be referred to simply as "the BPI of the particular recording region". Based on the BER of each circumferential position, for example, each sector of a particular track, the data controller 620 controls the BPI of each sector of the track. Based on the BER of a particular recording region of the disk 10, the data controller 620 may control a write data characteristic value, for example, a recording capability corresponding to data to be written to the particular recording region of the disk 10. In the following, for the sake of convenience of explanation, "the recording capability corresponding to data to be written to the particular recording region" may be referred to simply as "the recording capability of the particular recording region". The BER may also mean the frequency of a signal corresponding to the BER. The BPI may also mean the frequency of a signal corresponding to the BPI. In addition, the recording capability also means the frequency of a signal corresponding to the recording capability.

The data controller 620 may calculate the BER of each sector of a particular track of the disk 10 in real time. Note that the data controller 620 may calculate the BER of each sector of each track of the disk 10 and may store the calculated BER of each sector of each track in particular storage regions, for example, the system area 10b of the disk 10, the nonvolatile memory 80, and the like.

Based on the write characteristic, for example, the overwrite (hereinafter referred to also as the OW) of a particular recording region, for example, a zone, a track or a sector of the disk 10, the data controller 620 controls the BPI of the recording region. In a case where other data (hereinafter referred to as subsequent data) is written over data (hereinafter referred to as previous data) written in a particular recording region, for example, a zone, a track or a sector, the OW corresponds to the attenuation rate of the previous data. If the OW of a particular recording region, for example, a sector, a track or a zone which is currently accessed (hereinafter referred to also as a current access region) is high, for example, higher than an OW as a reference (hereinafter referred to also as a reference OW), the BER of the current access region in a case data is written to the current access region (hereinafter referred to as an on-track BER) may be low, for example, lower than a BER as a reference (hereinafter referred to also as a reference BER). In other words, if the OW of the current access region is higher than the reference OW, the on-track BER may be improved. In the following, a region having an OW higher than the reference OW may be referred to also as a high OW region. If the current access region is a high OW region, the influence of a write process for the current access region on a recording region adjacent to the current access region in the radial direction (hereinafter referred to as an adjacent region) may be large. In other words, if the current access region is a high OW region, the influence of a write process for the adjacent region of the current access region (hereinafter referred to also as the influence of an adjacent write process) on the current access region may be large. In the following, the BER of the current access region in a case where data is written to the adjacent region of the current access region may be referred to as an adjacent track write BER. In addition, "being adjacent" means not only a case where regions, objects, or spaces are successively arranged in the radial direction but also a case where regions, objects, or spaces are arranged at some distance from each other but can still assumed to be substantially adjacent to each other. If the current access region is a high OW region, the possibility that data is written to the adjacent region of the current access region and data written in the current access region is thereby erased may be high. That is, as the number of writes of data to the adjacent region (hereinafter referred to also as the number of adjacent writes) of the recording region having low on-track BER (hereinafter referred to also as a low on-track BER region) increases, the adjacent track write BER of the low on-track BER region (hereinafter referred to also as a low adjacent track write BER) may increase. In other words, as the number of adjacent writes of data to the low BER adjacent region increases, the low adjacent track write BER may be degraded.

On the other hand, if the OW of the current access region is low, for example, lower than the reference OW, the on-track BER may be high, for example, higher than the reference BER. In other words, if the OW of the current access region is lower than the reference OW, the on-track BER may be degraded. In the following, a region having an OW lower than the reference OW may be referred to also as a low OW region. If the current access region is a low OW region, the influence of the write process for the current access region on the adjacent region of the current access region may be small. In other words, if the current access region is a low OW region, the influence of the adjacent write process may be small. Therefore, if the current access region is a low OW region, the possibility that data is written to the adjacent region of the current access region and data written in the current access region is thereby erased may be low. That is, as the number of adjacent writes of data to the adjacent region (hereinafter referred to also as a high BER adjacent region) of the recording region having high on-track BER (hereinafter referred to also as a high on-track BER region) increases, the adjacent track write BER of the high on-track BER region (hereinafter referred to also as a high adjacent track write BER) may decrease. In other words, as the number of writes of data to the high BER adjacent region increases, the high adjacent track write BER may be improved as compared to the low adjacent track write BER or may be maintained. Note that the OW may also mean the frequency of a signal corresponding to the OW.

Based on the OW of each circumferential position, for example, each sector of a particular track, the data controller 620 controls the BPI of each sector of the track. For example, in the case of realizing a uniform on-track BER within one lap of a currently accessed track (hereinafter referred to also as an access track), the data controller 620 adjusts (corrects or sets) the BPI of the region such that the BPI of the region becomes higher than the current BPI of the region in the high OW region, and adjusts (corrects or sets) the BPI of the region such that the BPI of the region becomes lower than the current BPI of the region in the low OW region. In other words, for example, in the case of realizing a uniform on-track BER within one lap of the access track, the data controller 620 adjusts the BPI of the region such that the BPI of the region becomes higher than the current BPI of the region based on the BER of the region in the low on-track BER region, and adjusts the BPI of the region such that the BPI of the region becomes lower than the current BPI of the region based on the BER of the region in the high on-track BER region. The term "uniform" or "equal" means a case where BERs are completely the same for sure but also means a case where BERs are different but can still be assumed to be substantially the same.

For example, in order to realize a uniform adjacent track write BER within one lap of the access track, the data controller 620 adjusts (corrects or sets) the BPI of the region such that the BPI of the region becomes lower than the current BPI of the region based on the OW of the region in the high OW region, and adjusts the BPI of the region such that the BPI of the region becomes higher than the current BPI of the region based on the OW of the region in the low OW region. In other words, in order to realize a uniform adjacent track write BER within one lap of the access track, the data controller 620 adjusts the BPI of the region such that the BPI of the region becomes lower than the current BPI of the region based on the BER of the region in the low on-track BER region, and adjusts the BPI of the region such that the BPI of the region becomes higher than the current BPI of the region based on the BER of the region in the high on-track BER region.

The data controller 620 may calculate the OW of each sector of a particular track of the disk 10 in real time. For example, based on the BER of each sector of a particular track of the disk 10, the data controller 620 may calculate the OW of each sector of the track in real time. Note that the data controller 620 may calculate the OW of each sector of each track of the disk 10 and may record the calculated OW of each sector of each track on particular storage regions, for example, the system area 10*b* of the disk 10, the nonvolatile memory 80, and the like. For example, the data controller 620 may calculate the OW of each sector of a particular track based on the BER of each sector of the particular track, and may record the calculated OW of each sector of the track to particular storage regions, for example, the system area 10*b* of the disk 10, the nonvolatile memory 80, and the like.

Based on the BER or the OW of a sector (hereinafter referred to as a next sector) located successively in the read/write direction with respect to a currently accessed particular sector (hereinafter referred to as a current sector), the data controller 620 adjusts (corrects or sets) the BPI of the next sector. For example, during the time of seeking from a particular track to a sector to be targeted (hereinafter referred to as a target sector) of a track to be targeted (hereinafter referred to as a target track), the data controller 620 sets (or calculates) a BPI to which the BPI of the target sector is adjusted (hereinafter referred to also as an adjustment BPI) based on the BER or the OW of the target sector, and adjusts (corrects or sets) the current BPI of the target sector to the adjustment BPI before the time of reaching a data portion of the target sector. That is, the data controller 620 sets (or calculates) the adjustment BPI of the target sector based on the BER or the OW of the target sector in a region in which an access process (read/write process) is not executed during the time of seeking, and adjusts (corrects or sets) the current BPI of the target sector to the adjustment BPI before the time of reaching the data portion of the target sector. In the case of seeking from the particular track to the target track, it is highly possible that the difference between the write data characteristic value of the particular sector of the particular track and the write data characteristic value of the target sector of the target track is large. Therefore, it is possible that the adjustment of the write data characteristic value may not be completed until the time of accessing from the particular sector of the particular track to the target sector. For this reason, the data controller 620 sets (or calculates) the adjustment BPI of the target sector during the time of seeking, and thereby avoids overhead. For example, in the current sector of the access track, the data controller 620 sets the adjustment BPI of the next sector based on the BER or the OW of the next sector and adjusts (corrects or sets) the current BPI of the next sector to the adjustment BPI before the time of reaching the data portion of the next sector.

Figure 5:
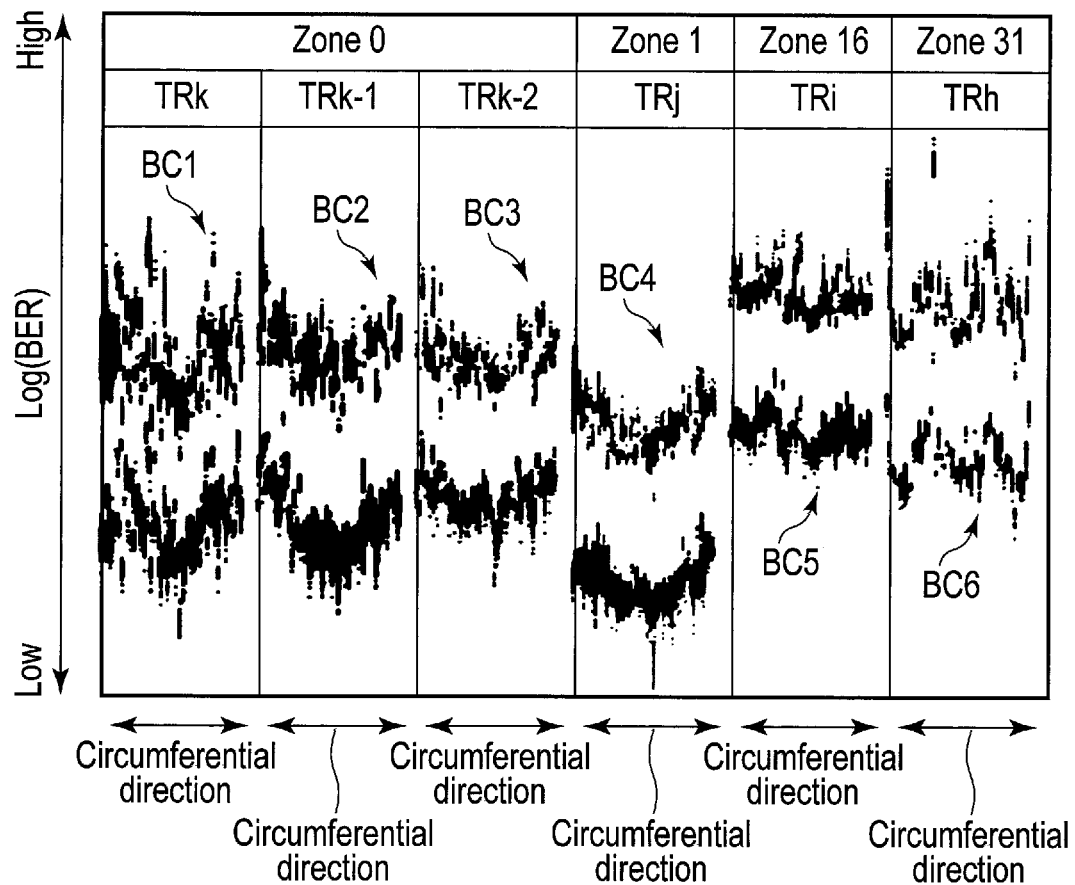
FIG. 5 is an illustration showing an example of a BER within one lap of each track of each zone of the disk.

FIG. 5 is an illustration showing an example of a BER within one lap of each track of each zone of the disk 10. FIG. 5 shows an example of the actually-measured BER of each zone of the disk 10. In FIG. 5, the horizontal axis indicates the circumferential direction and the vertical axis indicates a log (BER). On the vertical axis, the log (BER) increases in a direction toward the pointing end of an arrow indicating high, and decreases in a direction toward the pointing end of an arrow indicating low. FIG. 5 shows zone 0 and zone 1 which are located in the outer circumferential region OR, zone 16 which is located in the middle circumferential region MR, and zone 31 which is located in the inner circumferential region IR. In FIG. 5, a track TRk, a track TRk-1 and a track Rk-2 are located in zone 0 and a track TRj is located in zone 1. A track TRi is located in zone 16. In addition, a track TRh is located in zone 31. FIG. 5 shows a change BC1 of the log (BER) within one lap of the track TRk, a change BC2 of the log (BER) within one lap of the track TRk-1, a change BC3 of the log (BER) within one lap of the track TRk-2, a change BC4 of the log (BER) within one lap of the track TRj, a change BC5 of the log (BER) within one lap of the track TRi, and a change BC6 of the log (BER) within one lap of the track TRh.

On the disk 10, the BER of each recording region may change due to nonuniformity in film formation, etc. For example, the change of the BER within one lap of a particular track can be approximated using a sine wave. In addition, since the inner side of the disk 10 is clamped by a clamper, the change of the BER within one lap of a particular track may vary between the inner circumferential region IR and the outer circumferential region OR. In the example shown in FIG. 5, each of the changes BC1, BC2 and BC3 of the log (BER) within one lap of each of the tracks TRk-2 to TRk corresponds to a sine wave having one period, and the change BC6 of the log (BER) within one lap of the track TRh corresponds to a sine wave having two periods. As shown in FIG. 5, the change of the BER within one lap of a particular track of the disk 10 can be approximated using a sine wave. Therefore, the data controller 620 may calculate the change of the BER within one lap of a particular track of the disk 10 by sinusoidal approximation. For example, the data controller 620 may calculate the change of the BER within one lap of the particular track of the disk 10 by sinusoidal approximation in real time at the time of accessing the particular track. Alternatively, the data controller 620 may calculate the change of the BER within one lap of each track of the disk 10 by sinusoidal approximation, and may record the calculated change of the BER within one lap of each track on particular storage regions, for example, the system area 10b of the disk 10, the nonvolatile memory 80, and the like.

Figure 6:
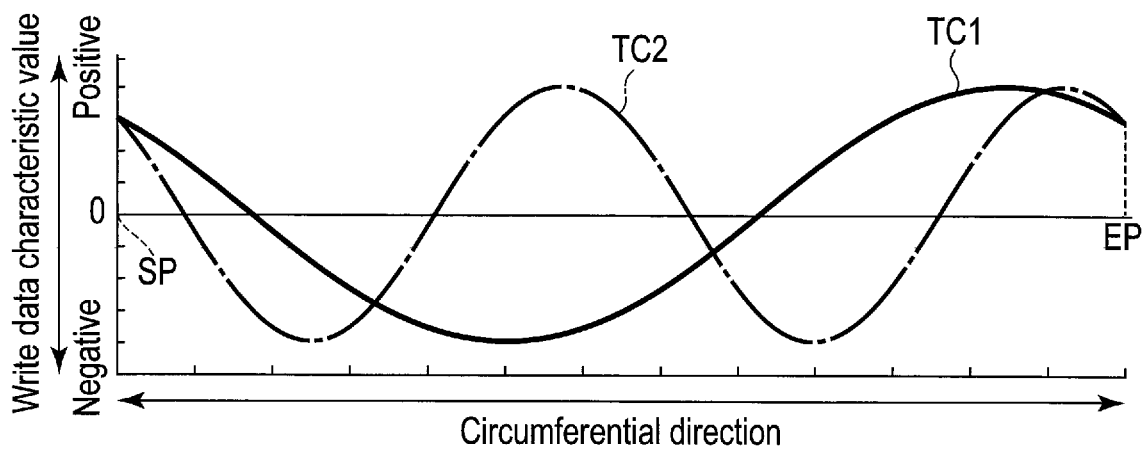
FIG. 6 is an illustration showing an example of a change of a write data characteristic value according to the first embodiment.

FIG. 6 is an illustration showing an example of a change of a write data characteristic value according to the present embodiment. In FIG. 6, the horizontal axis indicates the circumferential direction and the vertical axis indicates the write data characteristic value. The write data characteristic value includes, for example, the BPI, the recording capability, and the like. A start position SP and an end position EP are indicated on the horizontal axis of FIG. 6. The start position SP corresponds to a position in which an access process starts on a particular access track. The end position EP corresponds to a position in which an access process ends on the particular access track. The start position SP and the end position EP are, for example, the same. On the vertical axis of FIG. 6, the write data characteristic value increases in a direction of a positive value in a direction toward the pointing end of an arrow indicating a positive value from an origin point (=0) and decreases in a direction of a negative value in a direction toward the pointing end of an arrow indicating a negative value from the origin point. FIG. 6 shows change TC1 of the write data characteristic value within one lap of a particular access track of the outer circumferential region OR, and change TC2 of the write data characteristic value within one lap of a particular access track of the inner circumferential region IR. The change of the write data characteristic value corresponds to each write data characteristic value in each circumferential position, for example, in each sector.

In order to realize a uniform on-track BER or a uniform adjacent track write BER within one lap of a particular access track, the data controller 620 calculates the write data characteristic value within one lap of the access track, for example, by sinusoidal approximation based on the change of the write characteristic within one lap of the access track. For example, in order to realize a uniform on-track BER or a uniform adjacent track write BER within one lap of a particular access, the data controller 620 calculates each write data characteristic value of each sector of the access track by the following formula based on each BER of each sector of the access track, and adjusts to the calculated write data characteristic value in each sector.

$$\Delta WV = A \times \sin(PD \times 2\pi \times 1/SVS \times (SVN - (WS + SVS/4/PD)))\quad \text{Formula (1)}$$

where $\Delta WV$ is the write data characteristic value (the change of the write data characteristic value), A is the gain (or amplitude) of the write data characteristic value, PD is the period of the change of the write data characteristic value, WS is the sector number of a sector having the lowest signal to noise (SN) ratio on a particular access track, SVS is the number of sectors within one lap of the particular access track, and SVN is the sector number of the sector to be targeted (hereinafter referred to as a target sector). As shown in the formula (1), at the time of executing sinusoidal approximation, the data controller 620 can adjust the amplitude, the phase and the period of each sector. For example, as shown in the formula (1), at the time of executing sinusoidal approximation, the data controller 620 can individually adjust the amplitude, the phase and the period of the change of the write data characteristic value in each sector. The data controller 620 can adjust the number of periods of the change of the write data characteristic value of each sector of the inner circumferential region IR, for example, two periods, which is greater than the number of periods of the change of the data characteristic value of each sector of the outer circumferential region OR, for example, one period. In other words, the data controller 620 can adjust a greater number of periods in each sector of the inner circumferential region IR than the data controller 620 can do in each sector of the outer circumferential region OR.

For example, the data controller 620 calculates the change TC1 of the write data characteristic value by the formula (1) based on the BER of each sector of a particular access track of the outer circumferential region OR, and adjusts each write data characteristic value of each sector of the access track based on the calculated change TC1 of the write data characteristic value.

For example, the data controller 620 calculates the change TC2 of the write characteristic value by the formula (1) based on the BER of each sector of an access track located in the inner circumferential region IR, and adjusts each write data characteristic value of each sector of the access track based on the calculated change TC2 of the write data characteristic value.

Figure 7:
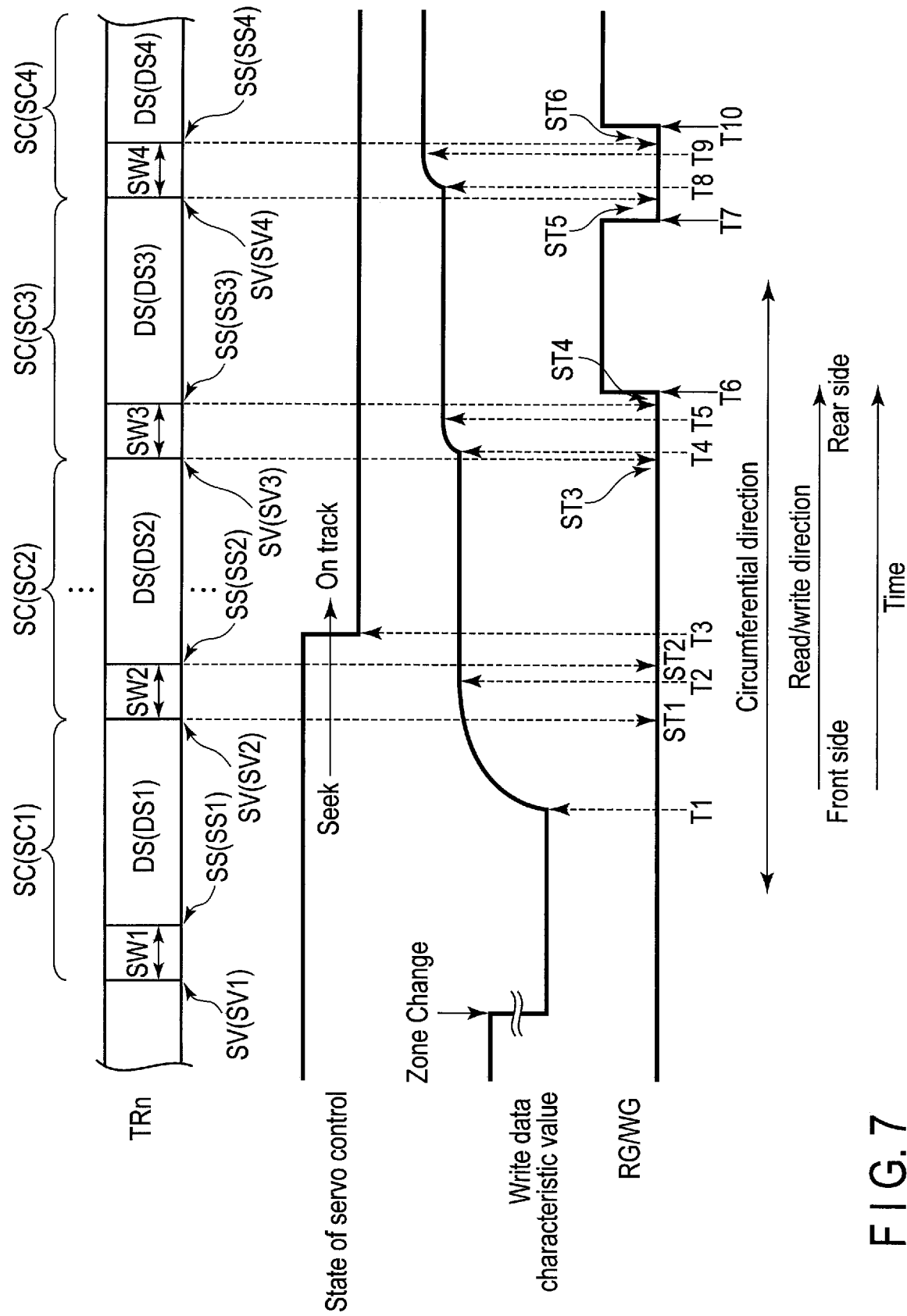
FIG. 7 is an illustration showing an example of a write data characteristic value adjustment process according to the first embodiment.

FIG. 7 is an illustration showing an example of a write data characteristic value adjustment process according to the present embodiment. In FIG. 7, the horizontal axis indicates the circumferential direction and time. FIG. 7 shows a track TRn, a state of servo control, a write data characteristic value, and a read gate (RG)/write gate (WG). The track TRn includes a plurality of sectors SC (SC1, SC2, SC3, SC4, . . . , etc.). Each of the sectors SC includes a plurality of servo sectors SS (SS1, SS2, SS3, SS4, . . . , etc.) and a plurality of data portions DS (DS1, DS2, DS3, DS4, . . . , etc.). The sectors SC1 to SC4 are arranged in this order in the read/write direction. The sector SC1 includes the servo sector SS1 and the data portion DS1. The sector SC2 includes the servo sector SS2 and the data portion DS2. The sector SC3 includes the servo sector SS3 and the data portion DS3. The sector SC4 includes the servo sector SS4 and the data portion DS4. The servo sectors SS1 to SS4 are arranged in this order and spaced apart from one another in the read/write direction. The servo sector SS1 is included in a servo region SV1, the servo sector SS2 is included in a servo region SV2, the servo sector SS3 is included in a servo region SV3, and the servo sector SS4 is included in a servo region SV4. In FIG. 7, a width in the circumferential direction of the servo sector SS1 (hereinafter referred to simply as a width of the servo sector) SW1, a width SW2 of the servo sector SS2, a width SW3 of the servo sector SS3, and a width SW4 of the servo sector SS4 are the same. Note that the widths SW1 to SW4 may be different from one another. The data portions DS1 to DS4 are arranged in this order and spaced apart from one another in the read/write direction. The data portion DS1 is located between the servo sectors SS1 and SS2, the data portion DS2 is located between the servo sectors SS2 and SS3, the data portion DS3 is located between the servo sectors SS3 and SS4, and the data portion DS4 is located on the rear side in the read/write direction of the servo sector SS4. Timings T1, T2, T3, T4, T5, T6, T7, T8, T9 and T10 and timings ST1, ST2, ST3, ST4, ST5 and ST6 are indicated on the horizontal axis of FIG. 7. The timing T2 corresponds to a timing later than the timing T1, the timing T3 corresponds to a timing later than the timing T2, the timing T4 corresponds to a timing later than the timing T3, the timing T5 corresponds to a timing later than the timing T4, the timing T6 corresponds to a timing later than the timing T5, the timing T7 corresponds to a timing later than the timing T6, the timing T8 corresponds to a timing later than the timing T7, the timing T9 corresponds to a timing later than the timing T8, and the timing T10 corresponds to a timing later than the timing T9. The timing ST1 is a timing between the timings T1 and T2, and corresponds to the front end position in the circumferential direction (hereinafter referred to simply as the front end position) of the servo sector SS2. The timing ST2 is a timing between the timings T2 and T3, and corresponds to the rear end position on the opposite side from the front end position in the circumferential direction (hereinafter referred to simply as the rear end position) of the servo sector SS2. The timing ST3 is a timing between the timings T3 and T4, and corresponds to the front end position of the servo sector SS3. The timing ST4 is a timing between the timings T5 and T6, and corresponds to the rear end position of the servo sector SS3. The timing ST5 is a timing between the timings T7 and T8, and corresponds to the front end position of the servo sector SS4. The timing ST6 is a timing between the timings T9 and T10, and corresponds to the rear end position of the servo sector SS4. In FIG. 7, the state of servo control indicates a timing for switching between seek and on-track on the track TRn. In the example shown in FIG. 7, seek and on-track are switched at the timing T3. In FIG. 7, the write data characteristic value indicates a change of the write data characteristic value. In FIG. 7, the RG/WG indicates a timing for access.

At the start of seeking from a track other than the track TRn to the track (target track) TRn, the data controller 620 adjusts the write data characteristic value, for example, the BPI or the recording capability. In the example illustrated, at the start of seeking from a track other than the target track TRn to the sector (target sector) SC2 of the target track TRn, the data controller 620 sets the write data characteristic value to 0. The data controller 620 sets (or calculates) a write data characteristic value to which the write data characteristic value of the data portion DS2 is adjusted (hereinafter referred to also as an adjustment characteristic value) based on the BER of the data portion DS2 of the target sector SC2, and adjusts the current write data characteristic value of the data portion DS2 to the adjustment characteristic value before the time of writing data to the data portion DS2. In the example shown in FIG. 7, the data controller 620 sets the adjustment characteristic value of the data portion DS2 based on the BER of the data portion during the time of seeking, starts adjusting the current data characteristic value of the data portion DS2 to the adjustment characteristic value at the timing T1, and completes the adjustment of the current write data characteristic value of the data portion DS2 to the adjustment characteristic value at the timing T2 corresponding to the servo sector SS2. The data controller 620 positions on (on-tracks) the target track TRn, accesses the target track TRn, sets the adjustment characteristic value of the data portion of the next sector based on the BER of the data portion of the next sector, and adjusts the current write data characteristic value of the data portion of the next sector to the adjustment characteristic value within a time interval corresponding to the width of the servo sector of the next sector. In the example shown in FIG. 7, the data controller 620 positions on (on-tracks) the data portion DS2 of the target track TRn at the timing T3, sets the adjustment characteristic value of the data portion DS3 based on the BER of the data portion DS3, starts adjusting the current write data characteristic value of the data portion DS3 to the adjustment characteristic value at the timing T4 corresponding to the servo sector SS3, and completes the adjustment of the current write data characteristic value of the data portion DS3 to the adjustment characteristic value at the timing T5 corresponding to the servo sector SS3. The data controller 620 starts accessing the data portion DS3 of the target track TRn at the timing T6, sets the adjustment characteristic value of the data portion DS4 based on the BER of the data portion DS4, ends the access to the data portion DS3 of the target track TRn at the timing T7, starts adjusting the current write data characteristic value of the data portion DS4 to the adjustment characteristic value at the timing T8 corresponding to the servo sector SS4, completes the adjustment of the current write data characteristic value of the data portion DS4 to the adjustment characteristic value at the timing T9 corresponding to the servo sector SS4, and starts accessing the data portion DS4 at the timing T10.

Figure 8:
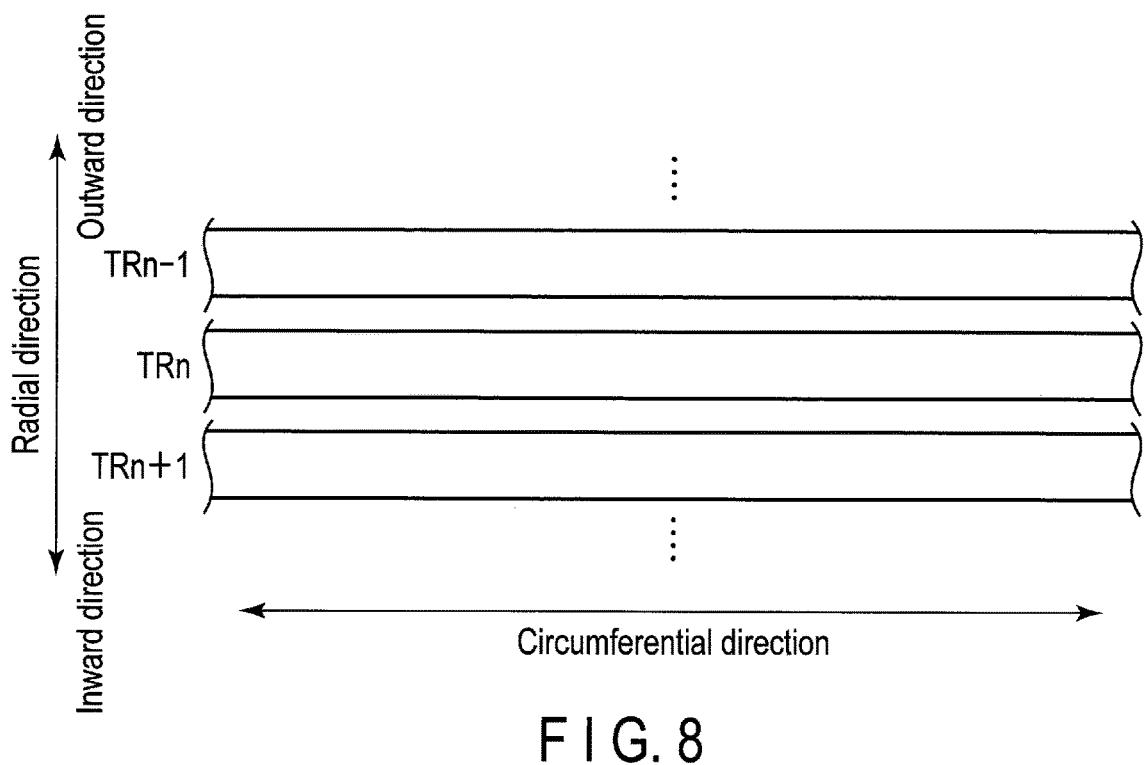
FIG. 8 is an illustration showing an example of an influence of a write process for a current access region on an adjacent region.

FIG. 8 is an illustration showing an example of an influence of a write process for a current access region on an adjacent region. FIG. 8 shows tracks TRn−1, TRn and TRn+1 which are successively arranged and spaced apart from one another in the radial direction.

In the example shown in FIG. 8, in order to realize a uniform on-track BER within one lap of the currently accessed track TRn, the data controller 620 adjusts the BPI upward based on the OW in the high OW region of the track TRn, and adjusts the BPI such that the BPI becomes lower than the reference BPI based on the OW in the low OW region of the track TRn. In other words, in order to realize a uniform on-track BER within one lap of the currently accessed track TRn, the data controller 620 adjusts the BPI upward based on the BER in the low on-track BER region, and adjusts the BPI downward the BPI based on the BER in the high on-track BER region.

In the example shown in FIG. 8, in order to realize a uniform adjacent track write BER, that is, a uniform BER of the track TRn in a case where data is written to the tracks TRn−1 and TRn+1, within one lap of the currently accessed track TRn, the data controller 620 adjusts the BPI downward based on the OW in the high OW region of the track TRn, and adjusts the BPI upward based on the OW in the low OW region of the track TRn. In other words, in order to realize a uniform adjacent track write BER within one lap of the access track, the data controller 620 adjusts the BPI downward based on the BER in the low on-track BER, and adjusts the BPI upward based on the BER in the high on-track BER region.

Figure 9:
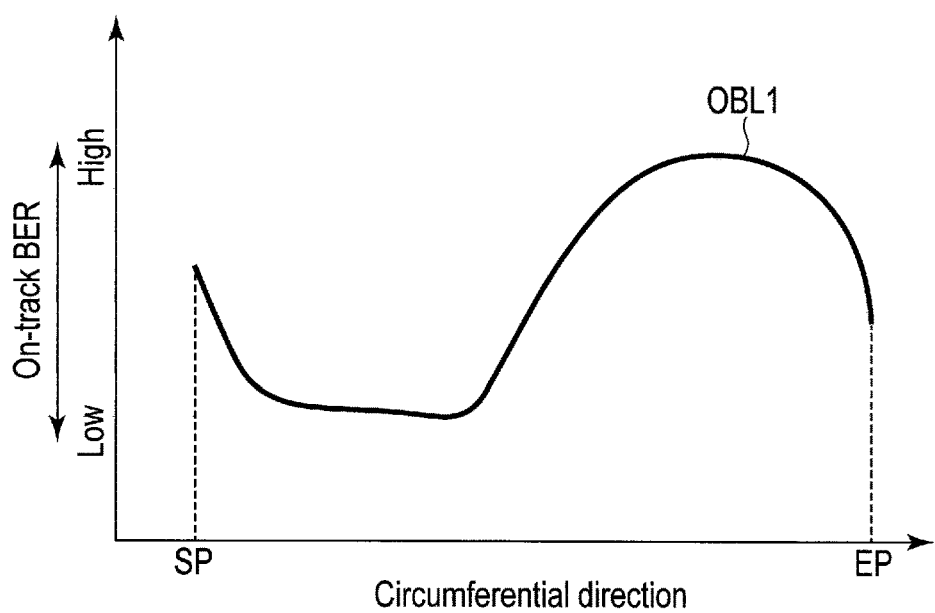
FIG. 9 is an illustration showing an example of a change of an on-track BER within one lap of a particular track of the disk.

FIG. 9 is an illustration showing an example of a change OBL1 of an on-track BER within one lap of a particular track of the disk 10. In FIG. 9, the horizontal axis indicates the circumferential direction and the vertical axis indicates the on-track BER. On the vertical axis of FIG. 9, the on-track BER increases in a direction of an arrow indicating high and decreases in a direction of an arrow indicating low. The change OBL1 of the on-track BER shown in FIG. 9 may be caused, for example, by nonuniformity in film formation. The change OBL1 of the on-track BER shown in FIG. 9 corresponds to a change of the on-track BER of a particular track on which correction or adjustment of the BPI is not executed.

In the example shown in FIG. 9, the change OBL1 of the on-track BER has a sine-wave shape from a start position SP to an end position EP.

FIG. 10 is an illustration showing an example of a change OWL1 of an overwrite (OW) corresponding to FIG. 9. In FIG. 10, the horizontal axis indicates the circumferential direction and the vertical axis indicates the OW. On the vertical axis of FIG. 10, the OW increases in a direction of an arrow indicating high and decreases in a direction of an arrow indicating low.

In the example shown in FIG. 10, the change OWL1 of the OW has a wave shape from a start position SP to an end position EP. The change OWL1 of the OW has the shape of the inverted change OBL1 of the on-track BER is inverted.

FIG. 11 is an illustration showing an example of a change AWB1 of an adjacent track write BER corresponding to FIG. 9. In FIG. 11, the horizontal axis indicates the circumferential direction and the vertical axis indicates the adjacent track write BER. On the vertical axis of FIG. 11, the adjacent track write BER increases in a direction of an arrow indicating high and decreases in a direction of an arrow indicating low. In FIG. 11, the change AWB1 of the adjacent track write BER corresponds to a change of the BER within one lap of the track of FIG. 9 in a case where a write process is executed for an adjacent track of the track of FIG. 9 several tens of times, for example, ten times.

In the example shown in FIG. 11, the change AWB1 of the adjacent track write BER has a wave shape from a start position SP to an end position EP. The shape of the change AWB1 of the adjacent track write BER is similar to the shape of the change OWL1 of the OW.

FIG. 12 is an illustration showing an example of a change AWB2 of an adjacent track write BER corresponding to FIG. 9. In FIG. 12, the horizontal axis indicates the circumferential direction and the vertical axis indicates the adjacent track write BER. On the vertical axis of FIG. 12, the adjacent track write BER increases in a direction of an arrow indicating high and decreases in a direction of an arrow indicating low. In FIG. 12, the change AWB2 of the adjacent track write BER corresponds to a change of the BER within one lap of the track of FIG. 9 in a case where a write process is executed for an adjacent track of the track of FIG. 9 several thousands of times, for example, one thousand times.

In the example shown in FIG. 12, the change AWB2 of the adjacent track write BER has a wave shape from a start position SP to an end position EP. The amplitude of the change AWB2 of the adjacent track write BER is greater than the amplitude of the change AWB1 of the adjacent track write BER.

FIG. 13 is an illustration showing an example of a change BPL1 of an adjustment BPI on the track corresponding to the change OBL1 of the on-track BER of FIG. 9. In FIG. 13, the horizontal axis indicates the circumferential direction and the vertical axis indicates the BPI. On the vertical axis of FIG. 13, the BPI increases in a direction of an arrow indicating high and decreases in a direction of an arrow indicating low.

In a region where the change OBL1 of the on-track BER of FIG. 9 is low (low on-track BER region), the data controller 620 increases the BPI of the region based on the BER of the region as shown in FIG. 13. In a region where the change OBL1 of the on-track BER of FIG. 9 is high (high on-track BER region), the data controller 620 reduces the BPI of the region based on the BER of the region as shown in FIG. 13. In other words, in a region where the change OWL1 of the OW of FIG. 10 is high (high OW region), the data controller 620 increases the BPI of the region based on the OW of the region as shown in FIG. 13. In a region where the change OWL1 of the OW of FIG. 10 is low (low OW region), the data controller 620 reduces the BPI of the region based on the OW of the region as shown in FIG. 13. As the BPI is adjusted in each sector of the track corresponding to the change OBL1 of the on-track BER of FIG. 9, the change of the BPI of the track turns to the change BPL1 of the BPI shown in FIG. 13.

Figure 14:
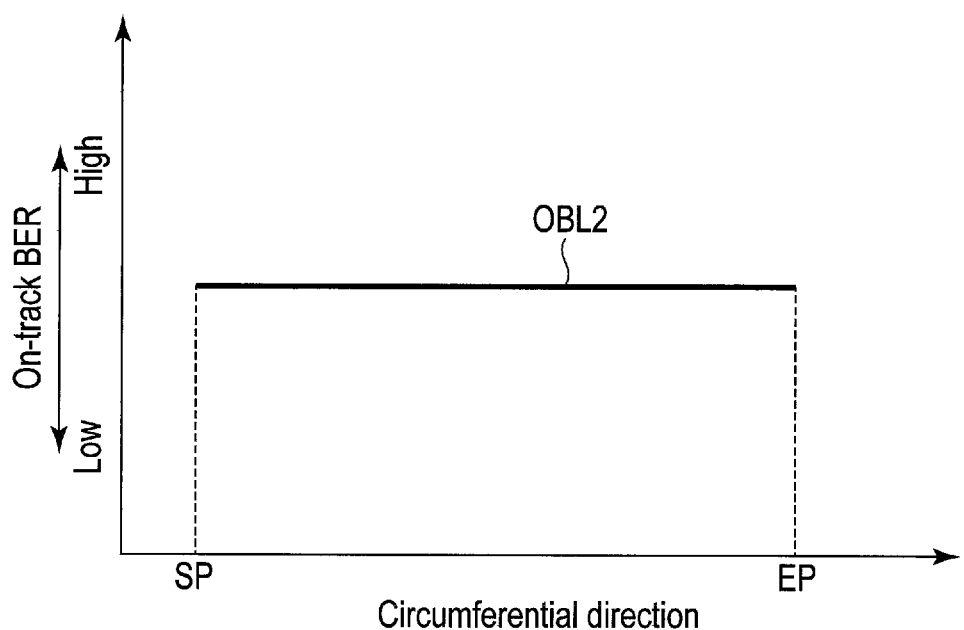
FIG. 14 is an illustration showing an example of a change of an on-track BER in a case where data is written to the track of FIG. 9 based on the change of the BPI of FIG. 13.

FIG. 14 is an illustration showing an example of a change OBL2 of an on-track BER in a case where data is written to the track of FIG. 9 based on the change BPL1 of the BPI of FIG. 13. In FIG. 14, the horizontal axis indicates the circumferential direction and the vertical axis indicates the on-track BER. On the vertical axis of FIG. 14, the on-track BER increases in a direction of an arrow indicating high and decreases in a direction of an arrow indicating low.

As shown in FIG. 14, in a case where data is written to the track of FIG. 9 based on the change BPL1 of the BPI of FIG. 13, the change OBL2 of the on-track BER of the track of FIG. 9 may become uniform within one lap.

Figure 15:
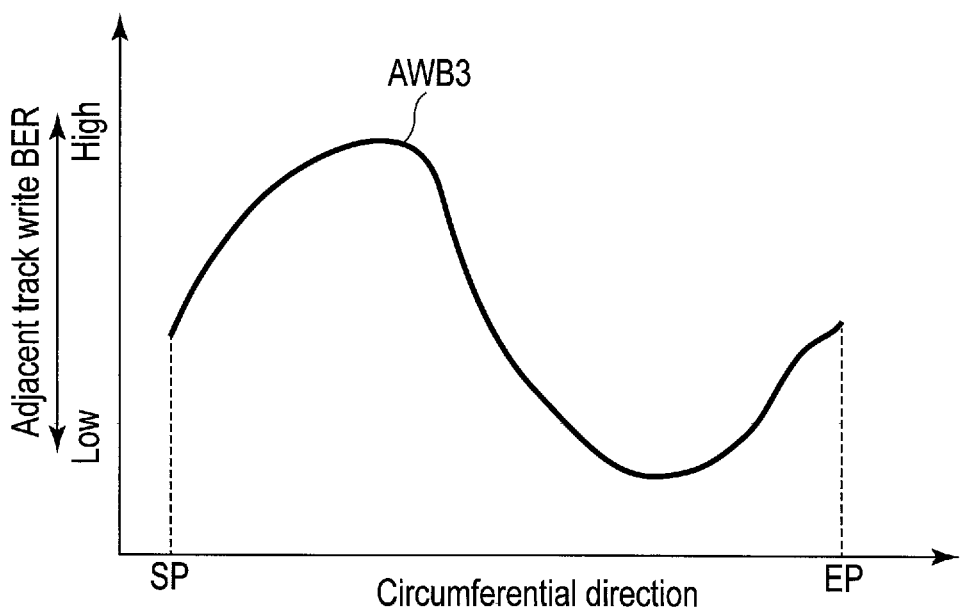
FIG. 15 is an illustration showing an example of a change of an adjacent track write BER in a case where data is written to an adjacent track of the track of FIG. 9 which is written based on the change of the BPI of FIG. 13.

FIG. 15 is an illustration showing an example of a change AWB3 of an adjacent track write BER in a case where data is written to an adjacent track of the track of FIG. 9 which is written based on the change BPL1 of the BPI of FIG. 13. In FIG. 15, the horizontal axis indicates the circumferential direction and the vertical axis indicates the adjacent track write BER. On the vertical axis of FIG. 15, the adjacent track write BER increases in a direction of an arrow indicating high and decreases in a direction of an arrow indicating low. In FIG. 15, the change AWB3 of the adjacent track write BER corresponds to a change of the BER within one lap of the track corresponding to FIGS. 13 and 14 in a case where a write process is executed for an adjacent track of the track corresponding to FIGS. 13 and 14 several thousands of times, for example, one thousand times.

In a region where the change OBL1 of the on-track BER of FIG. 9 is low (low on-track BER region), the change AWB3 of the adjacent track write BER is high as shown in FIG. 15. In a region where the change OBL1 of the on-track BER of FIG. 9 is high (high on-track BER region), the change AWB3 of the adjacent track write BER is low as shown in FIG. 15. In other words, in a region where the change OWL1 of the OW of FIG. 10 is high (high OW region), the change AWB3 of the adjacent track write BER is high as shown in FIG. 15. In a region where the change OWL1 of the OW of FIG. 10 is low (low OW region), the change AWB3 of the adjacent track write BER is low as shown in FIG. 15.

FIG. 16 is an illustration showing an example of a change BPL2 of an adjustment BPI on the track corresponding to the change OBL1 of the on-track BER of FIG. 9. In FIG. 16, the horizontal axis indicates the circumferential direction and the vertical axis indicates the BPI. On the vertical axis of FIG. 16, the BPI increases in a direction of an arrow indicating high and decreases in a direction of an arrow indicating low.

In a region where the change OBL1 of the on-track BER of FIG. 9 is low (low on-track BER region), the data controller 620 reduces the BPI of the region based on the BER of the region as shown in FIG. 16. In a region where the change OBL1 of the on-track BER of FIG. 9 is high (high on-track BER region), the data controller 620 increases the BPI of the region based on the BER of the region as shown in FIG. 16. In other words, in a region where the change OWL1 of the OW of FIG. 10 is high (high OW region), the data controller 620 reduces the BPI of the region based on the OW of the region as shown in FIG. 16. In a region where the change OWL1 of the OW of FIG. 10 is low (low OW region), the data controller 620 increases the BPI of the region based on the OW of the region as shown in FIG. 16.

FIG. 17 is an illustration showing an example of a change OBL3 of an on-track BER in a case where data is written to the track of FIG. 9 based on the change BPL2 of the BPI of FIG. 16. In FIG. 17, the horizontal axis indicates the circumferential direction and the vertical axis indicates the on-track BER. On the vertical axis of FIG. 17, the on-track BER increases in a direction of an arrow indicating high and decreases in a direction of an arrow indicating low.

In a region where the change OBL1 of the on-track BER of FIG. 9 is low (low on-track BER region), the change OBL3 of the on-track BER is low as shown in FIG. 17. In a region where the change OBL1 of the on-track BER of FIG. 9 is high (high on-track BER region), the change OBL3 of the on-track BER is high as shown in FIG. 17. In other words, in a region where the change OWL1 of the OW of FIG. 10 is high (high OW region), the change OBL3 of the on-track BER is low as shown in FIG. 17. In a region where the change OWL1 of the OW of FIG. 10 is low (low OW region), the change OBL3 of the on-track BER is high as shown in FIG. 17.

FIG. 18 is an illustration showing an example of a change AWB4 of an adjacent track write BER in a case where data is written to an adjacent track of the written track of FIG. 9 based on the change BPL2 of the BPI of FIG. 16. In FIG. 18, the horizontal axis indicates the circumferential direction and the vertical axis indicates the adjacent track write BER. On the vertical axis of FIG. 18, the adjacent track write BER increases in a direction of an arrow indicating high and decreases in a direction of an arrow indicating low. In FIG. 18, the change AWB4 of the adjacent track write BER corresponds to a change of the BER within one lap of the track corresponding to FIGS. 16 and 17 in a case where a write process is executed for an adjacent track of the track corresponding to FIGS. 16 and 17 several thousands of times, for example, one thousand times.

As shown in FIG. 18, in a case where data is written to the adjacent track of the written track of FIG. 9 based on the change BPL2 of the BPI of FIG. 16, the change AWB4 of the adjacent track write BER of the track of FIG. 9 may become uniform within one lap.

FIG. 19 is a flowchart showing an example of a BPI adjustment method according to the present embodiment. FIG. 19 shows an example of a method for adjusting the BPI of a particular track for the purpose of achieving a uniform on-track BER within one lap of the particular track.

The system controller 130 adjusts the BPI during the time of seeking (B1901). For example, the system controller 130 sets the adjustment BPI of the target sector based on the BER or the OW of the target sector during the time of seeking, starts adjusting the current BPI of the target sector to the adjustment BPI before the time of reaching the data portion of the target sector, and completes the adjustment of the current BPI of the target sector to the adjustment BPI within the time interval corresponding to the width of the servo sector of the target sector. The system controller 130 determines whether the target sector is a high OW region or a low OW region (B1902). In other words, the system controller 130 determines whether the target sector is a low on-track BER region or a high on-track BER region. If the target sector is determined to be a high OW region (high OW region of B1902), the system controller 130 adjusts the BPI of the target sector upward based on the OW of the target sector (B1903). In other words, if the target sector is determined to be a low on-track BER region, the system controller 130 calculates the BER of the target sector, and adjusts the BPI of the target sector upward based on the calculated BER of the target sector. If the target sector is determined to be a low OW region (low OW region of B1902), the system controller 130 adjusts the BPI of the target sector downward based on the OW of the target sector (B1904). In other words, if the target sector is determined to be a high on-track BER region, the system controller 130 calculates the BER of the target sector and adjusts the BPI of the target sector downward based on the calculated BER of the target sector.

The system controller 130 adjusts the BPI of the next sector (B1905). For example, in the current sector, the system controller 130 sets the adjustment BPI of the next sector based on the BER or the OW of the next sector, starts adjusting the current BPI of the next sector to the adjustment BPI before the time of reaching the data portion of the next sector, and completes the adjustment of the current BPI of the next sector to the adjustment BPI within the time interval corresponding to the width of the servo sector. The system controller 130 determines whether the next sector is a high OW region or a low OW region (B1906). If the next sector is determined to be a high OW region (high OW region of B1906), the system controller 130 adjusts the BPI of the next sector upward based on the OW of the next sector (B1907) and ends the process. If the next sector is determined to be a low OW region (low OW region of B1906), the system controller 130 adjusts the BPI of the next sector downward based on the OW of the next sector (B1908) and ends the process.

Figure 20:
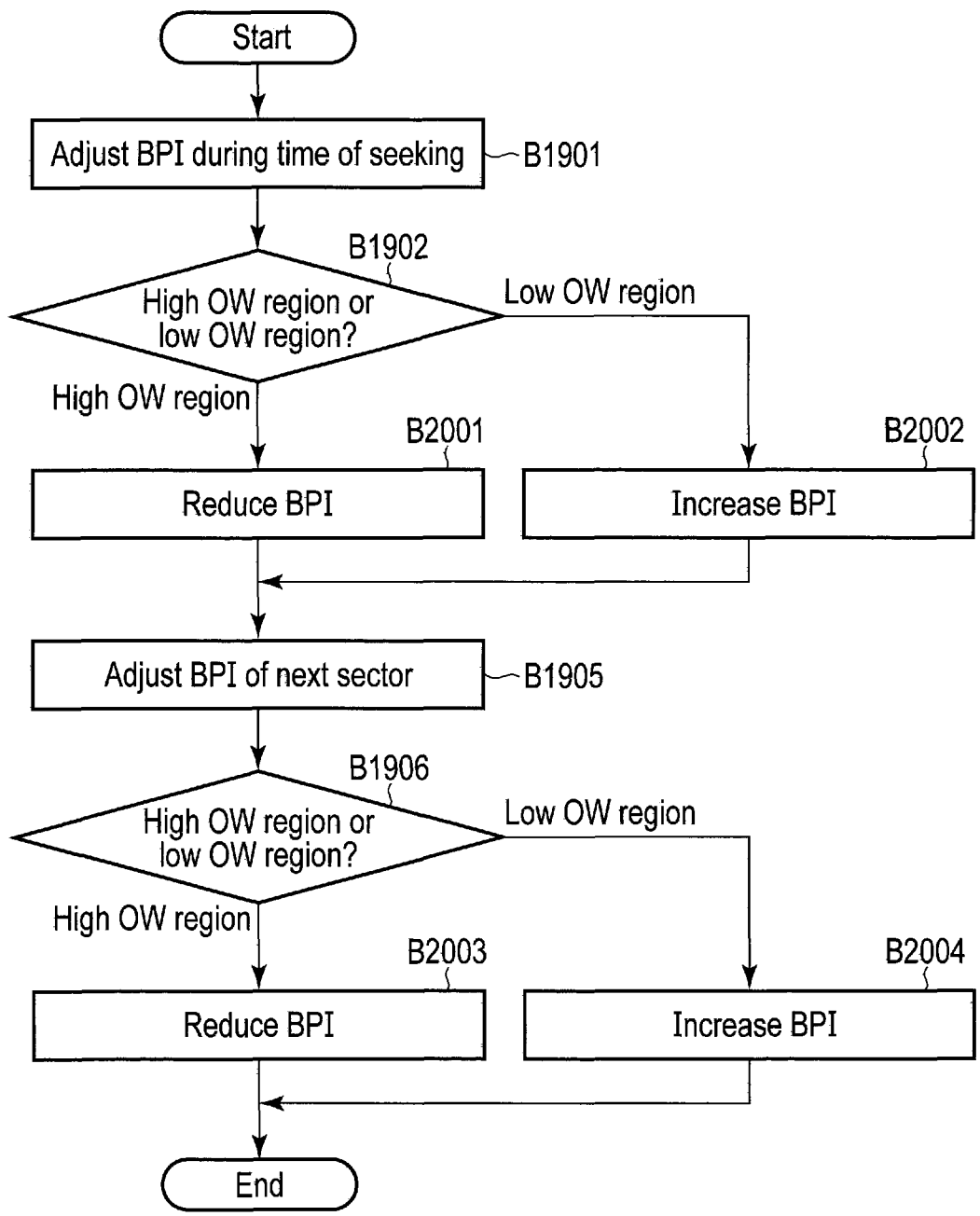
FIG. 20 is a flowchart showing an example of the BPI adjustment method according to the first embodiment.

FIG. 20 is a flowchart showing an example of a BPI adjustment method according to the present embodiment. FIG. 20 shows an example of a method for adjusting the BPI of a particular track for achieving a uniform adjacent track write BER within one lap of the particular track.

The system controller 130 adjusts the BPI during the time of seeking (B1901) and determines whether the target sector is a high OW region or a low OW region (B1902). If the target sector is determined to be a high OW region (high OW region of B1902), the system controller 130 adjusts the BPI of the target sector downward based on the OW of the target sector (B2001). In other words, if the target sector is determined to be a low on-track BER region, the system controller 130 calculates the BER of the target sector and adjusts the BPI of the target sector downward based on the calculated BER of the target sector. If the target sector is determined to be a low OW region (low OW region of B1902), the system controller 130 adjusts the BPI of the target sector upward based on the OW of the target sector (B2002). In other words, if the target sector is determined to be a high on-track BER region, the system controller 130 calculates the BER of the target sector and adjusts the BPI of the target sector upward based on the calculated BER of the target sector.

The system controller 130 adjusts the BPI of the next sector (B1905) and determines whether the next sector is a high OW region or a low OW region (B1906). If the next sector is determined to be a high OW region (high OW region of B1906), the system controller 130 adjusts the BPI of the next sector downward based on the OW of the next sector (B2003) and ends the process. If the next sector is determined to be a low OW region (low OW region of B1906), the system controller 130 adjusts the BPI of the next sector upward based on the OW of the next sector (B2004) and ends the process.

According to the present embodiment, the magnetic disk device 1 sets the adjustment BPI of the target sector based on the BER or the OW of the target sector during the time of seeking, starts adjusting the current BPI of the target sector to the adjustment BPI before the time of reaching the data portion of the target sector, and completes the adjustment of the current BPI of the target sector to the adjustment BPI within the time interval corresponding to the width of the servo sector of the target sector. Furthermore, in the current sector, the magnetic disk device 1 sets the adjustment BPI of the next sector based on the BER or the OW of the next sector, starts adjusting the current BPI of the next sector to the adjustment BPI before the time of reaching the data portion of the next sector, and completes the adjustment of the current BPI of the next sector to the adjustment BPI within the time interval corresponding to the width of the servo sector of the next sector. In the case of achieving a uniform on-track BER within one lap of a particular track, the magnetic disk device 1 adjusts the BPI of the region such that the BPI of the region becomes higher than the current BPI of the region based on the OW of the region in the high OW region, and adjusts the BPI of the region such that the BPI of the region becomes lower than the current BPI of the region based on the OW of the region in the low OW region. In other words, in the case of achieving a uniform on-track BER within one lap of a particular track, the magnetic disk device 1 calculates the BER of the region and adjusts the BPI of the region such that the BPI of the region becomes higher than the current BPI of the region based on the calculated BER in the low on-track BER region, and the magnetic disk device 1 calculates the BER of the region and adjusts the BPI of the region such that the BPI of the region becomes lower than the current BPI of the region based on the calculated BER of the region in the high on-track BER region. In the case of achieving a uniform adjacent track write BER within one lap of a particular track, the magnetic disk device 1 adjusts the BPI of the region such that the BPI of the region becomes lower than the current BPI of the region based on the OW of the region in the high OW region, and the magnetic disk device 1 adjusts the BPI of the region such that the BPI of the region becomes higher than the current BPI of the region based on the OW of the region in the low OW region. In other words, in the case of achieving a uniform adjacent track write BER within one lap of a particular track, the magnetic disk device 1 calculates the BER of the region and adjusts the BPI of the region such that the BPI of the region becomes lower than the current BPI of the region based on the calculated BER in the low on-track BER region, and the magnetic disk device 1 calculates the BER of the region and adjusts the BPI of the region such that the BPI of the region becomes higher than the current BPI of the region based on the calculated BER in the high on-track BER region. The magnetic disk device 1 can realize a uniform on-track BER or a uniform adjacent track write BER within one lap of a particular track. Therefore, the magnetic disk device 1 can improve access performance.

Next, magnetic disk devices according modification examples and other embodiments will be described. In the modification examples and the other embodiments, the same portions as those of the aforementioned embodiment will be denoted by the same reference numbers, and detailed descriptions thereof will be omitted.

Modification Example 1

A magnetic disk device 1 of a modification example 1 differs from the magnetic disk device 1 of the first embodiment in terms of adjustment of a recording capability.

Based on the write characteristic, for example, the BER of a particular recording region, for example, a zone, a track or a sector of the disk 10, the data controller 620 controls the write data characteristic value, for example, the recording capability of data to be written to the recording region. Based on the BER of each circumferential position, for example, each sector of a particular track, the data controller 620 controls the recording capability of each sector of the track.

Based on the write characteristic, for example, the OW of a particular recording region, for example, a zone, a track or a sector of the disk 10, the data controller 620 controls the recording capability of the recording region. Based on the OW of each circumferential position, for example, each sector of a particular track, the data controller 620 controls the recording capability of each sector of the track.

For example, in order to realize a uniform BER (on-track BER and adjacent track write BER) within one lap of the access track, the data controller 620 adjusts (corrects or sets) the recording capability of the region such that the recording capability of the region becomes higher than the current recording capability of the region based on the OW of the region in the low OW region, and adjusts (corrects or sets) the recording capability of the region such that the recording capability of the region becomes lower than the current recording capability of the region based on the OW of the region in the high OW region. In other words, in order to realize a uniform BER within one lap of the access track, the data controller 620 adjusts (corrects or sets) the recording capability of the region such that the recording capability of the region becomes higher than the current recording capability of the region based on the BER of the region in the high on-track BER region, and adjusts (corrects or sets) the recording capability of the region such that the recording capability of the region becomes lower than the current recording capability of the region based on the BER of the region in the low on-track BER region.

On the access track, the data controller 620 adjusts the recording capability of the next sector based on the OW or the BER of the next sector. For example, the data controller 620 sets (calculates) a recording capability to which the recording capability of the target sector is adjusted (referred to also as an adjustment capability or an adjustment current) based on the BER or the OW of the target sector during the time of seeking from the particular track to the target sector of the target track, and adjusts (corrects or sets) the current recording capability of the target sector to the adjustment capability before the time of reaching to the data portion of the target sector. For example, in the current sector of the access track, the data controller 620 sets the adjustment capability of the next sector based on the BER or the OW of the next sector and adjusts (corrects or sets) the current recording capability of the next sector to the adjustment capability before the time of reaching the data portion of the next sector. For example, the data controller 620 synchronizes a timing of completion of recording of data from the R/W channel 40 to the register of the head amplifier IC 30 with a timing of rise of a servo gate via a serial I/F, and adjusts the recording capability.

FIG. 21 is an illustration showing an example of the timing for changing the recording capability. In FIG. 21, the horizontal axis indicates time. FIG. 21 shows the servo gate and the serial I/F. The serial I/F of FIG. 21 shows address indicating the address of a sector to which write data is to be written, and data corresponding to a current value corresponding to write data.

As shown in FIG. 21, in the case of adjusting the recording capability, the data controller 620 synchronizes the timing for changing the recording capability by the recording capability controller 310 of the head amplifier IC 30 with the timing of rise of the servo gate via the serial I/F.

FIG. 22 is an illustration showing an example of a change OWL2 of an overwrite (OW) according to the modification example 1. In FIG. 22, the horizontal axis indicates the circumferential direction and the vertical axis indicates the OW. On the vertical axis of FIG. 22, the OW increases in a direction of an arrow indicating high and decreases in a direction of an arrow indicating low. For example, the change OWL2 of the OW shown in FIG. 10 corresponds to a change of the OW of a particular track on which adjustment or correction of the recording capability or the BPI is not executed. For example, the change OWL2 of the OW of FIG. 22 is substantially the same as the change OWL1 of the OW of FIG. 10.

In the example shown in FIG. 22, the change OWL2 of the OW has a wave shape, for example, a sine-wave shape from a start position SP to an end position EP.

FIG. 23 is an illustration showing an example of a change RCL1 of a recording capability which is adjusted on the track corresponding to the change OWL2 of the OW of FIG. 22. In FIG. 23, the horizontal axis indicates the circumferential direction and the vertical axis indicates the recording capability. On the vertical axis of FIG. 23, the recording capability increases in a direction of an arrow indicating high and decreases in a direction of an arrow indicating low.

In a region where the change OWL2 of the OW of FIG. 22 is low (low OW region), the data controller 620 increases the recording capability of the region based on the OW of the region as shown in FIG. 23. In a region where the change OWL2 of the OW of FIG. 22 is high (high OW region), the data controller 620 reduces the recording capability of the region based on the OW of the region as shown in FIG. 23. In other words, in a region where the change OWL1 of the OW of FIG. 10 is high (high OW region), the data controller 620 increases the BPI based on the OW as shown in FIG. 13. In a region where the change OWL1 of the OW of FIG. 10 is low (low OW region), the data controller 620 reduces the BPI based on the OW as shown in FIG. 13. As the recording capability is adjusted in each sector of the track corresponding to the change OWL2 of the OW of FIG. 22, the change of the recording capability of the track turns to the change RCL1 of the recording capability shown in FIG. 23.

FIG. 24 is an illustration showing an example of a change OBL4 of an on-track BER in a case where data is written to the track of FIG. 23 based on the change OWL2 of the OW of FIG. 22. In FIG. 24, the horizontal axis indicates the circumferential direction and the vertical axis indicates the on-track BER. On the vertical axis of FIG. 24, the on-track BER increases in a direction of an arrow indicating high and decreases in a direction of an arrow indicating low.

As shown in FIG. 24, when data is written to the track of FIG. 23 based on the change OWL2 of the OW of FIG. 22, the change OBL4 of the on-track BER of the track of FIG. 23 may become uniform within one lap.

FIG. 25 is an illustration showing an example of a change AWB5 of an adjacent track write BER in a case where data is written to an adjacent track of the track of FIG. 23 which is written based on the change OWL2 of the OW of FIG. 22. In FIG. 25, the horizontal axis indicates the circumferential direction and the vertical axis indicates the adjacent track write BER. On the vertical axis of FIG. 25, the adjacent track write BER increases in a direction of an arrow indicating high and decreases in a direction of an arrow indicating low. In FIG. 25, the change AWB5 of the adjacent track write BER corresponds to a change of the BER within one lap of the track corresponding to FIG. 23 in a case where a write process is executed for an adjacent track of the track corresponding to FIG. 23 several tens of times, for example, ten times.

As shown in FIG. 25, in a case where data is written to the adjacent track of the track of FIG. 23 which is written based on the change OWL2 of the OW of FIG. 22, the change AWB5 of the adjacent track write BER of the track of FIG. 23 may become uniform within one lap.

FIG. 26 is an illustration showing an example of a change AWB6 of an adjacent track write BER in a case where data is written to an adjacent track of the track of FIG. 23 which is written based the change OWL2 of the OW of FIG. 22. In FIG. 26, the horizontal axis indicates the circumferential direction and the vertical axis indicates the adjacent track write BER. On the vertical axis of FIG. 26, the adjacent track write BER increases in a direction of an arrow indicating high and decreases in a direction of an arrow indicating low. In FIG. 26, the change AWB6 of the adjacent track write BER corresponds to a change of the BER within one lap of the track of FIG. 23 in a case where a write process is executed for an adjacent track of the track corresponding to FIG. 23 several thousands of times, for example, one thousand times.

As shown in FIG. 26, in a case where data is written to the adjacent track of the track of FIG. 23 which is written based on the change OWL2 of the OW of FIG. 22, the change AWB6 of the adjacent track write BER of the track of FIG. 23 may become uniform within one lap.

Figure 27:
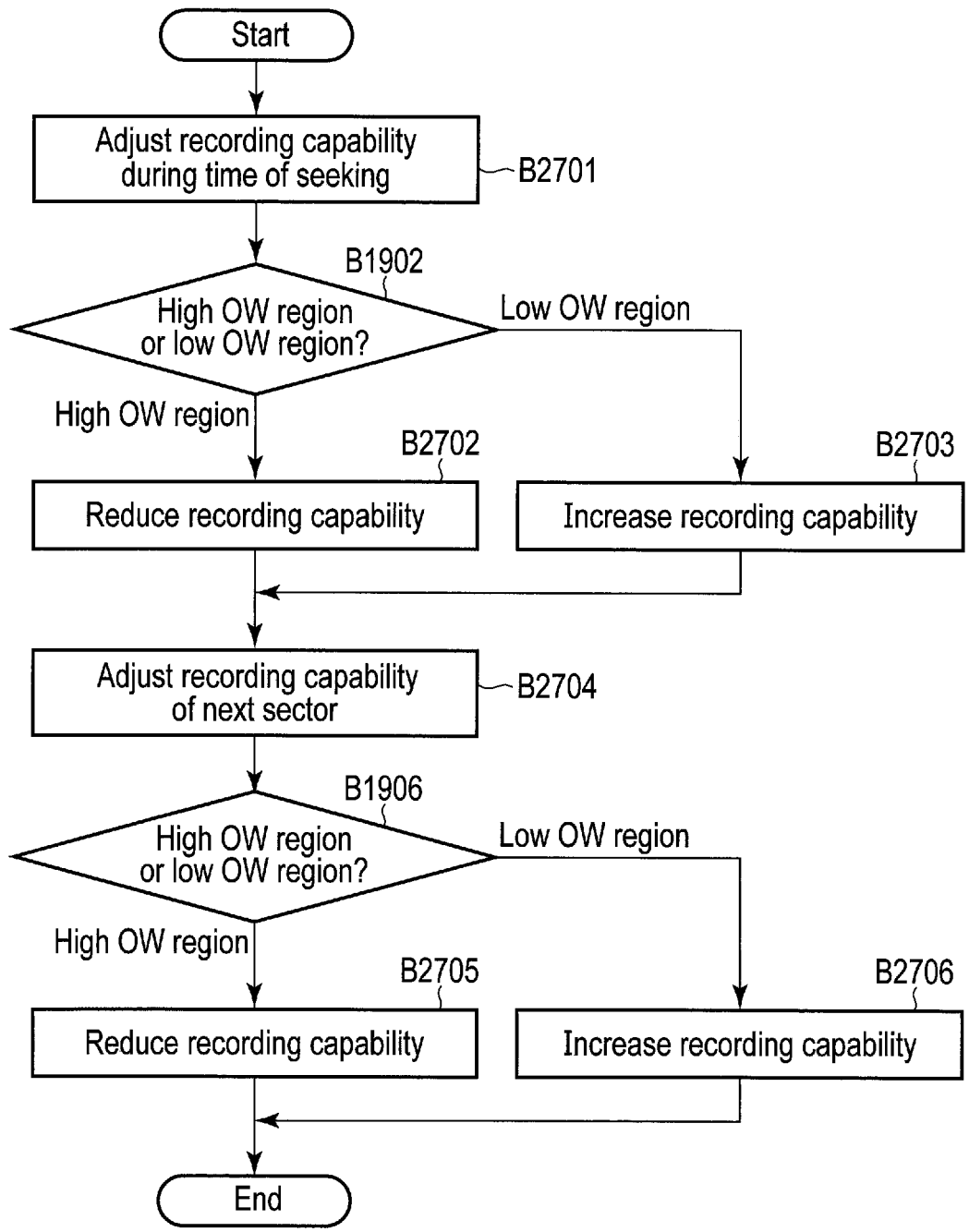
FIG. 27 is a flowchart showing an example of a recording capability adjustment method according to a modification example 1.

FIG. 27 is a flowchart showing an example of a recording capability adjustment method according to the modification example 1. FIG. 27 shows an example of a method for adjusting the recording capability of a particular track for achieving a uniform BER (on-track BER and adjacent track write BER) within one lap of the particular track.

The system controller 130 adjusts the recording capability during the time of seeking (B2701). For example, the system controller 130 sets the adjustment capability of the target sector based on the BER or the OW of the target sector during the time of seeking, starts adjusting the current recording capability of the target sector to the adjustment capability before the time of reaching the data portion of the target sector, and completes the adjustment of the current recording capability of the target sector to the adjustment capability within the time interval corresponding to the width of the servo sector of the target sector. The system controller 130 determines whether the target sector is a high OW region or a low OW region (B1902). If the target sector is determined to be a high OW region (high OW region of B1902), the system controller 130 adjusts the recording capability of the target sector downward based on the OW of the target sector (B2702). If the target sector is determined to be a low OW region (low OW region of B1902), the system controller 130 adjusts the recording capability of the target sector upward based on the OW of the target sector (B2703).

The system controller 130 adjusts the recording capability of the next sector (B2704). For example, in the current sector, the system controller 130 sets the adjustment capability of the next sector based on the BER or the OW of the next sector, starts adjusting the current recording capability of the next sector to the adjustment capability before the time of reaching the data portion of the next sector, and completes the adjustment of the current recording capability to the adjustment capability within the time interval corresponding to the width of the servo sector of the next sector. The system controller 130 determines whether the next sector is a high OW region or a low OW region (B1906). If the next sector is determined to be a high OW region (high OW region of B1906), the system controller 130 adjusts the recording capability of the next sector downward based on the OW of the next sector (B2705) and ends the process. If the next sector is determined to be a low OW region (low OW region of B1906), the system controller 130 adjusts the recording capability of the next sector upward based on the OW of the next sector (B2706) and ends the process.

According to the modification example 1, for example, the magnetic disk device 1 synchronizes the timing of completion of the recording of write data from the R/W channel 40 to the register of the head amplifier IC 30 with the timing of rise of the servo gate via the serial I/F, and adjusts the recording capability. In the case of achieving a uniform BER (on-track BER and adjacent track write BER) within one lap of the particular track, the magnetic disk device 1 adjusts the recording capability of the region such that the recording capability of the region becomes higher than the current recording capability of the region based on the OW of the region in the low OW region, and adjusts the recording capability of the region such that the recording capability of the region becomes lower than the current recording capability of the region based on the OW of the region in the high OW region. The magnetic disk device 1 can realize a uniform on-track BER and a uniform adjacent track write BER within one lap of the particular track. Therefore, the magnetic disk device 1 can improve access performance.

Modification Example 2

A magnetic disk device 1 according to a modification example 2 differs from the magnetic disk devices 1 of the aforementioned embodiment and the aforementioned modification example in terms of the write data characteristic value adjustment method.

FIG. 28 is an illustration showing an example of the non-projecting head 15, and FIG. 29 is an illustration showing an example of the projecting head 15.

The head 15 includes the slider 150 and a heater HT provided in the slider 150 and functioning as a heating element. The heater HT is connected to the head amplifier IC 30. When current (or voltage) is applied from the heat amplifier IC 30, the heater HT generates heat and heats a surrounding slider 150 portion. As heated by the heater HT1, the slider 150 projects toward the surface of the disk 10. Consequently, the flying height of the head 15 (the distance between the disk-facing surface 151 and the surface of the disk 10) is adjusted by the heater HT. Note that two or more heaters HT may be provided.

As shown in FIG. 28, in a case where power is not applied (OFF state) or minute current (voltage) is applied from the head amplifier IC 30 to the heater HT, the head 15 does not project toward the disk 10. Therefore, the flying height of the head 15 increases.

As shown in FIG. 29, in a case where power is applied from the head amplifier IC 30 to the heater HT (ON state), the head 15 projects toward the disk 10. Therefore, the flying height of the head 15 decreases.

For example, the data controller 620 adjusts the flying height of the head 15 in a sector corresponding to a maximum value of the write data characteristic value (for example, BPI and recording capability) on a particular track. In other words, the data controller 620 adjusts an amount of projection toward the disk 10 of the head 15 in the sector corresponding to the maximum value of the write data characteristic value on the particular track.

According to the modification example 2, the magnetic disk device 1 adjusts the flying height of the head 15 in a sector corresponding to a maximum value of the write data characteristic value (for example, BPI and recording capability) on a particular track. Therefore, the magnetic disk device 1 can prevent the head 15 from contacting the disk 10. Consequently, the magnetic disk device 1 can improve reliability.

Second Embodiment

A magnetic disk device 1 according to the second embodiment differs from the magnetic disk devices 1 of the aforementioned embodiment and the aforementioned modification examples in terms of the configuration of the servo region SV.

FIG. 30 is a schematic diagram showing an example of arrangement of normal servo NSV and short servo SSV according to the second embodiment.

For example, the servo region SV includes a servo region (hereinafter referred to as a normal servo region) NSV and a servo region different from the servo region NSV (hereinafter referred to as a short servo region) SSV. The length of a data pattern in the circumferential direction (hereinafter referred to simply as the length) of the short servo region SSV is less than the length of the normal servo region NSV. In the example shown in FIG. 2, the normal servo regions NSV and the short servo regions SSV are alternately arranged in the circumferential direction. In other words, one short servo region SSV is arranged between two successive normal servo regions NSV in the circumferential direction. Note that two or more short servo regions SSV may be arranged between two successive normal servo regions NSV in the circumferential direction. The normal servo region has a plurality of normal servo sectors. The normal servo sector corresponds to the servo sector SS shown in FIG. 3. The normal servo sector will be hereinafter referred to as a normal servo sector SS. The short servo region has a plurality of short servo sectors. In the following, the normal servo sector SS and the data portion subsequent to the normal servo sector SS may be referred to collectively as a normal sector. In addition, the short servo sector and the data portion subsequent to the short servo sector may be referred to collectively as a short sector.

FIG. 31 is a schematic diagram showing an example of the configuration of a short servo sector STS according to the second embodiment. FIG. 31 shows a particular short servo sector STS which is written to a particular track TRm. The short servo sector STS is included in the short servo region SSV shown in FIG. 30. The short servo sector STS corresponds to a part of the short servo region SSV corresponding to the particular track.

The short servo sector STS includes servo data, for example, N burst and Q burst. The N burst and the Q burst are successively arranged in a direction toward the pointing end of an arrow indicating the read/write direction in this order. For example, the length of the N burst of the short servo sector STS is substantially the same as the length of the N burst of the normal servo sector SS. Note that the length of the N burst of the short servo sector STS may be different from the length of the N burst of the normal servo sector SS. For example, the length of the Q burst of the short servo sector STS is substantially the same as the length of the Q burst of the normal servo sector SS. Note that the length of the Q burst of the short servo sector STS may be different from the length of the Q burst of the normal servo sector SS.

On the track including the normal sector and the short sector, the data controller 620 sets (or calculates) the adjustment characteristic value (adjustment BPI or adjustment capability) only in the normal sector, and adjusts the current write data characteristic value to the adjustment characteristic value of each of the normal sector and the short sector which is successively located in the read/write direction with respect to the normal sector.

For example, on the access track, if the data controller 620 reads preamble, servo mark, gray code and the like and thereby obtains a sector number in a currently accessed normal sector (hereinafter referred to as a current normal sector), based on the BER or the OW of a normal sector (hereinafter referred to also as the next normal sector) which is successively located in the read/write direction with respect to the current normal sector, the data controller 620 sets (or calculates) the adjustment BPI or the adjustment recording capability of each of the next normal sector and a short sector (hereinafter referred to also as the next short sector) which is successively located in the read/write direction with respect to a short sector (hereinafter referred to also as the current short sector) which is successively located in the read/write direction with respect to the current normal sector. In addition, the data controller 620 adjusts (corrects or sets) the current BPI or the current recording capability of each of the next normal sector and the next short sector to the adjustment BPI or the adjustment recording capability before the time of reaching the data portion of the next normal sector.

FIG. 32 is an illustration showing an example of a write data characteristic value adjustment process according to the second embodiment. In FIG. 32, the horizontal axis indicates the circumferential direction and time. FIG. 32 shows a track TRm. The track TRm includes a plurality of normal sectors NSC (NSC1, NSC2, . . . , etc.), a plurality of short sectors SSC (SSC1, SSC2, . . . , etc.), and a plurality of data portions DS (DS5, DS6, DS7, DS8, . . . , etc.). The normal sectors NSC and the short sectors SSC are alternately arranged in the circumferential direction. In FIG. 32, a normal sector NSC1, a short sector SSC1 and a normal sector NSC2 are arranged in this order in the read/write direction. The normal sector NSC1 includes a normal servo sector SS5 and a data portion DS5. The short sector SSC1 includes a short servo sector STS1 and a data portion DS6. The normal sector NSC2 includes a normal servo sector SS6 and a data portion DS7. The normal servo sector SS5, the short servo sector STS1, the normal servo sector SS6 and a short servo sector STS2 are arranged in this order and spaced apart from one another in the read/write direction. The normal servo sector SS5 is included in a normal servo region NSN1, the short servo sector STS1 is included in a short servo region SSV1, the normal servo sector SS6 is included in a normal servo region NSN2, and the short servo sector STS2 is included in a short servo region SSV2. In FIG. 32, a width SW5 of the normal servo sector SS5 and a width SW7 of the normal servo sector SS6 are the same. Note that the width SW5 and the width SW7 may be different from each other. A width SW6 of the short servo sector STS1 and a width SW8 of the short servo sector STS2 are the same.

Note that the width SW6 and the width SW8 may be different from each other. The widths SW5 and SW7 are greater than the widths SW6 and SW8. The data portions DS5 to DS8 are arranged in this order and spaced apart from one another in the read/write direction. The data portion DS5 is located between the normal servo sector SS5 and the short servo sector STS1, the data portion DS6 is located between the short servo sector STS1 and the normal servo sector SS6, the data portion DS7 is located between the normal servo sector SS6 and the short servo sector STS2, and the data portion DS8 is located on the rear side in the read/write direction of the short servo sector STS2. FIG. 32 shows the write data characteristic values, for example, a recording density (BPI) DN1 of each of the data portions DS5 and DS6, and a BPI DN2 of each of the data portions DS7 and DS8. The BPI DN2 is different from the BPI DN1. For example, the BPI DN2 is greater than the BPI DN1. Note that the BPI DN1 and the BPI DN2 may be the same.

Timings ST10, ST11, ST12, ST13, ST14, ST15, ST16 and ST17 are indicated on the horizontal axis of FIG. 32. The timing ST10 corresponds to the front end position of the normal servo sector SS5, and the timing ST11 corresponds to the rear end position of the normal servo sector SS5. The timing ST12 corresponds to the front end position of the short servo sector STS1, and the timing ST13 corresponds to the rear end position of the short servo sector STS1. The timing ST14 corresponds to the front end position of the normal servo sector SS6, and the timing ST15 corresponds to the rear end position of the normal servo sector SS6. The timing ST16 corresponds to the front end position of the short servo sector STS2, and the timing ST17 corresponds to the rear end position of the short servo sector STS2. FIG. 32 shows time intervals DT1, DT2, DT3 and DT4. The time interval DT1 corresponds to a difference between the timings ST10 and ST11 and corresponds to the width SW5 of the normal servo sector SS5. The time interval DT2 corresponds to a difference between the timings ST12 and ST13 and corresponds to the width SW6 of the short servo sector STS1. The time interval DT3 corresponds to a difference between the timings ST14 and ST15 and corresponds to the width SW7 of the normal servo sector SS6. The time interval DT4 corresponds to a difference between the timings ST16 and ST17 and corresponds to the width SW8 of the short servo sector STS2.

When the data controller 620 reads the normal servo sector SS5 and obtains a sector number in the normal sector (current normal sector) NSC1 of the track TRm, the data controller 620 sets the adjustment BPI DN2 of each of the data portion DS7 and the data portion DS8 of the next short sector SSC2 based on the BER or the OW of the data portion DS7 of the normal sector (next normal sector) NSC2, and adjusts the current BPI of each of the data portions DS7 and DS8 to the adjustment BPI DN2 before the time of reaching the data portion DS7. In the example shown in FIG. 32, when the data controller 620 reads the normal servo sector SS5 and obtains a sector number at the timing ST10, the data controller 620 sets the adjustment BPI DN2 of each of the data portion DS7 and the data portion DS8 of the next short sector SSC2 based on the BER or the OW of the data portion DS7 of the normal sector NSC2 before the time of reaching the timing ST14, starts adjusting the current BPI of each of the data portions DS7 and DS8 to the adjustment BPI DN2 at the timing ST14, and completes the adjustment of the current BPI of each of the data portions DS7 and DS8 to the adjustment BPI DN2 during the time interval DT3 from the timing ST14. As a result of BPI adjustment, the BPIs (adjustment BPIs) of two data portions which are adjacent to each other via the short servo sector STS, for example, the data portions DS5 and DS6 are the same. Note that, as a result of BPI adjustment, the BPIs (adjustment BPIs) of two data portions which are adjacent to each other via the short servo sector STS, for example, the data portions DS5 and DS6 may be different from each other. The BPIs (adjustment BPIs) of two data portions which are adjacent to each other via the normal servo sector SS, for example, the data portions DS6 and DS7 are different from each other. Note that the BPIs (adjustment BPIs) of two data portions which are adjacent to each other via the normal servo sector SS, for example, the data portions DS6 and DS7 may be the same.

FIG. 33 is a flowchart showing an example of a write data characteristic value adjustment method according to the second embodiment.

The system controller 130 determines whether a servo sector is a normal servo sector or a short servo sector (B3301). If the servo sector is determined to be a short servo sector (NO of B3301), the system controller 130 ends the process. If the servo sector is determined to be a normal servo sector (YES of B3301), the system controller 130 adjusts the write data characteristic value (B3302) and ends the process. For example, if the system controller 130 reads preamble, servo mark, gray code and the like and obtains a sector number in a particular sector, the system controller 130 determines that the sector is a normal sector. If the system controller 130 obtains a sector number, the system controller 130 sets the adjustment BPI or the adjustment recording capability of each of the next normal sector and the next short sector based on the BER or the OW of the next normal sector, adjusts the current BPI or the current recording capability of each of the next normal sector and the next short sector to the adjustment BPI or the adjustment capability before the time of reaching the data portion of the next normal sector, and ends the process.

According to the second embodiment, if the magnetic disk device 1 reads preamble, servo mark, gray code and the like and obtains a sector number, the magnetic disk device 1 sets the adjustment BPI or the adjustment capability of each of the next normal sector and the next short sector based on the BER or the OW of the next normal sector, and adjusts the current BPI or current recording capability of each of the next normal sector and the next short sector to the adjustment BPI or the adjustment capability before the time of reaching the data portion of the next normal sector. Therefore, the magnetic disk device 1 can improve access performance.

Modification Example 3

A magnetic disk device 1 according to a modification example 3 is substantially the same as the magnetic disk device 1 of the second embodiment in terms of the configuration but is different from the magnetic disk device 1 of the second embodiment in terms of the write data characteristic value adjustment method.

On the track including the normal sector and the short sector, the data controller 620 sets (or calculates) the adjustment characteristic value (adjustment BPI or adjustment capability) of each of the normal sector and the short sector, and adjusts the current write data characteristic value (BPI or recording capability) of each of the normal sector and the short sector to the adjustment characteristic value.

For example, in the current normal sector of the access track, the data controller 620 sets the adjustment BPI or the adjustment capability of the current short sector based on the BER or the OW of the current short sector, and adjusts (corrects or sets) the current BPI or the current recording capability of the current short sector to the adjustment BPI or the adjustment capability before the time of reaching the data portion of the current short sector. In the current short sector of the access track, the data controller 620 sets the adjustment BPI or the adjustment capability of the next normal sector based on the BER or the OW of the next normal sector, and adjusts (corrects or sets) the current BPI or recording capability of the next normal sector to the adjustment BPI or the adjustment capability before the time of reaching the data portion of the next normal sector.

Figure 34:
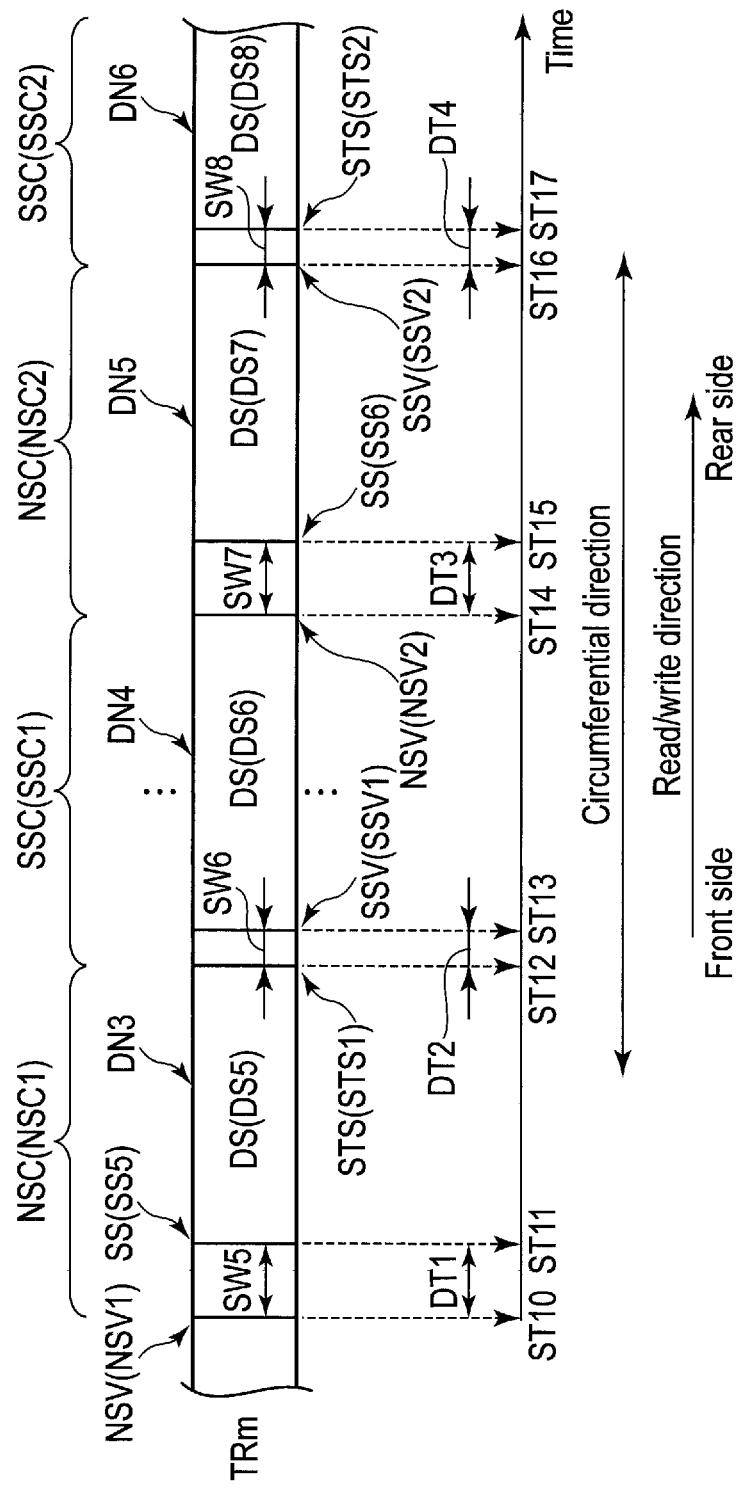
FIG. 34 is an illustration showing an example of a write data characteristic value adjustment process according to a modification example 3.

FIG. 34 is an illustration showing an example of a write data characteristic value adjustment process according to a modification example 3. FIG. 34 is substantially the same as FIG. 32 but is different from FIG. 32 in terms of the BPI of the data portion. FIG. 34 shows a write data characteristic value, for example, a recording density (BPI) DN3 of the data portion DS5, a BPI DN4 of the data portion DS6, a BPI DN5 of the data portion DS7, and a BPI DN6 of the data portion DS8. The BPIs DN4 to DN6 are different from one another. For example, the BPI DN5 is greater than the BPI DN4, the BPI DN6 is greater than the BPI DN5, the BPI DN7 is greater than the BPI DN6, and the BPI DN8 is greater than the BPI DN7. Note that the BPIs DN4 to DN6 may be the same.

In the normal sector (current normal sector) NSC1 of the track TRm, the data controller 620 sets the adjustment BPI DN4 of the data portion DS6 based on the BER or the OW of the data portion DS6 of the short sector (current short sector) SSC1, and adjusts the current BPI of the data portion DS6 to the adjustment BPI DN4 before the time of reaching the data portion DS6. In the example shown in FIG. 34, in the normal sector NSC1, the data controller 620 sets the adjustment BPI DN4 of the data portion DS6 based on the BER or the OW of the data portion DS6 of the short sector SSC1 before the time of reaching the timing ST12, starts adjusting the current BPI of the data portion DS6 to the adjustment BPI DN4 at the timing ST12, and completes the adjustment of the current BPI of the data portion DS6 to the adjustment BPI DN4 during the time interval DT2 from the timing ST12.

In the short sector SSC1, the data controller 620 sets the adjustment BPI DN5 of the data portion DS7 based on the BER or the OW of the data portion DS7 of the normal sector NSC2, and adjusts the current BPI of the data portion DS7 to the adjustment BPI DN5 before the time of reaching the data portion DS7. In the example shown in FIG. 34, in the short sector SSC1, the data controller 620 sets the adjustment BPI DN5 of the data portion DS7 based on the BER or the OW of the data portion DS7 of the normal sector NSC2 before the time of reaching the timing ST14, starts adjusting the current BPI of the data portion DS7 to the adjustment BPI DN5 at the timing ST14, and completes the adjustment of the current BPI of the data portion DS7 to the adjustment BPI DN5 during the time interval DT3 from the timing ST14.

In the normal sector NSC2, the data controller 620 sets the adjustment BPI DN6 of the data portion DS8 based on the BER or the OW of the data portion DS8 of the short sector SSC2, and adjusts the current BPI of the data portion DS8 to the adjustment BPI DN6 before the time of reaching the data portion DS8. In the example shown in FIG. 34, in the normal sector NSC2, the data controller 620 sets the adjustment BPI DN6 of the data portion DS8 based on the BER or the OW of the data portion DS8 of the short sector SSC2 before the time of reaching the timing ST16, starts adjusting the current BPI of the data portion DS8 to the adjustment BPI DN6 at the timing ST16, and completes the adjustment of the current BPI of the data portion DS8 to the adjustment BPI DN6 during the time interval DT4 from the timing ST16.

As a result of BPI adjustment, the BPIs (adjustment BPIs) of two data portions which are adjacent to each other via the short servo sector STS, for example, the data portions DS5 and DS6 are different from each other. Note that the BPIs (adjustment BPIs) of two data portions which are adjacent to each other via the short servo sector STS, for example, the data portions DS5 and DS6 may be the same. The BPIs (adjustment BPIs) of two data portions which are adjacent to each other via the normal servo sector SS, for example, the data portions DS6 and DS7 are different from each other. Note that the BPIs (adjustment BPIs) of two data portions which are adjacent to each other via the normal servo sector SS, for example, the data portions DS6 and DS7 may be the same.

Figure 35:
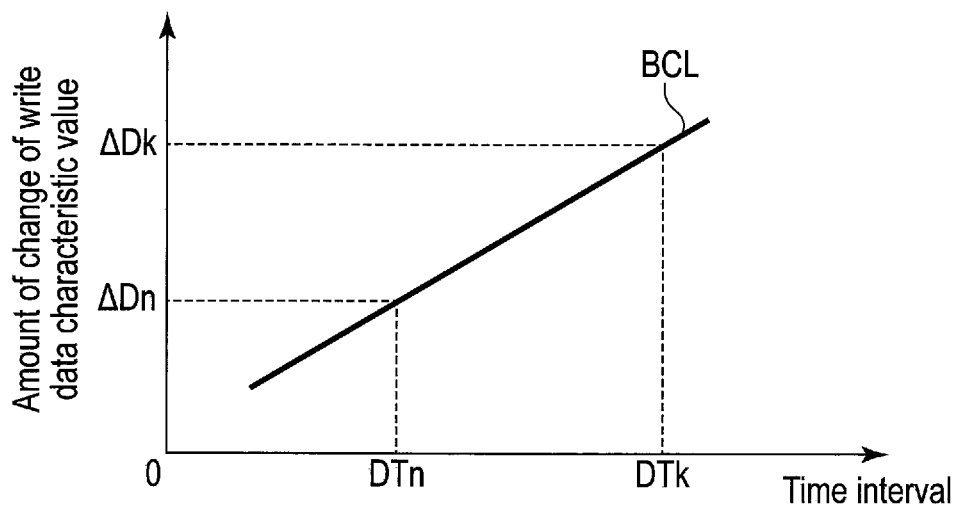
FIG. 35 is an illustration showing an example of a change of an amount of change of the write data characteristic value with respect to a time interval.

FIG. 35 is an illustration showing a change BCL of an amount of change of a write data characteristic value with respect to a time interval. In FIG. 35, the horizontal axis indicates the time interval, and the vertical axis indicates the write data characteristic value, for example, the amount of change of the BPI (hereinafter referred to as the BPI change amount). On the horizontal axis of FIG. 35, the time interval increases in a direction from an origin point toward an arrow. On the vertical axis, the BPI change amount increases in a direction from the origin point toward an arrow. On the horizontal axis of FIG. 35, a time interval DTn corresponds to the width of the short sector and a time interval DTk corresponds to the width of the normal servo sector. The time interval DTk is greater than the time interval DTn. The time interval DTn is, for example, 90 nanoseconds (nsec), and the time interval DTk is, for example, 310 nanoseconds (nsec). For example, on the vertical axis of FIG. 35, a BPI change amount ΔDn corresponds to the width of the short servo sector and a BPI change amount ΔDk corresponds to the width of the normal servo sector. The BPI change amount ΔDk is greater than the BPI change amount ΔDn. The BPI change amount ΔDn is, for example, 100 parts per million (ppm) and the BPI change amount ΔDk is, for example, 400 parts per million (ppm).

As shown in the change BCL of the BPI change amount with respect to the time interval, when the time interval increases, the BPI change amount increases, accordingly. Since the time interval DTn corresponding to the short servo sector STS is less than the time interval DTk corresponding to the width of the normal servo sector SS, the BPI change amount ΔDn is less than the BPI change amount ΔDk. Therefore, on the track including the normal sector and the short sector, the data controller 620 can change the write data characteristic (BPI or recording capability) in the short sector more significantly than the data controller 620 can do in the short sector.

Figure 36:
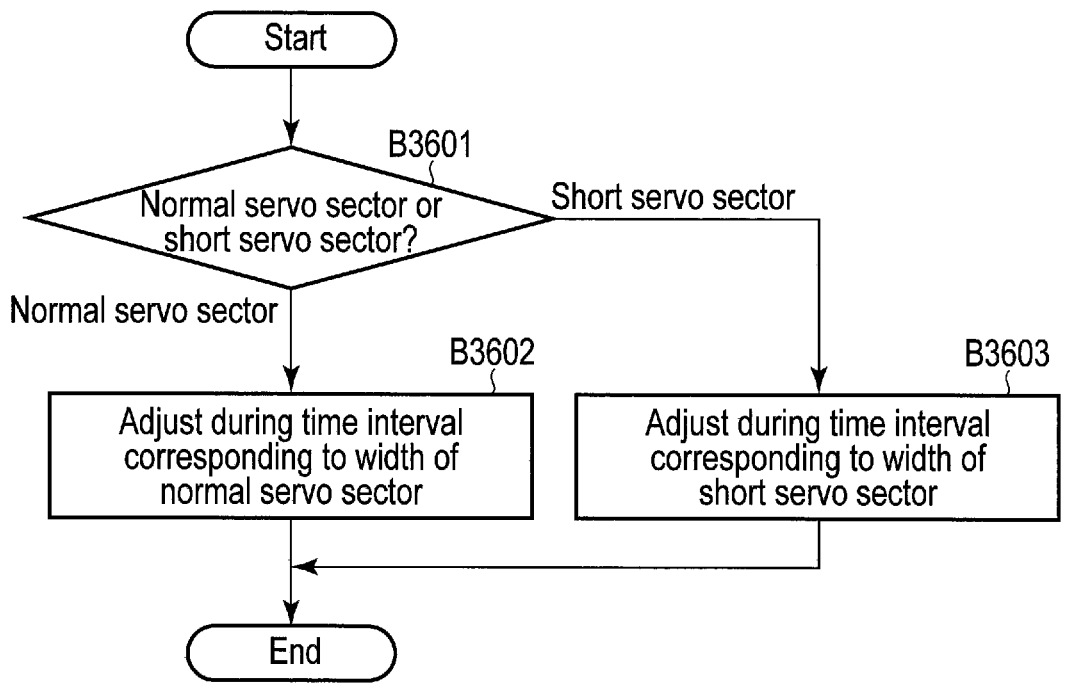
FIG. 36 is a flowchart showing an example of the write data characteristic value adjustment process according to the modification example 3.

FIG. 36 is a flowchart showing an example of the write data characteristic value adjustment method according to the modification example 3.

The system controller 130 determines whether the servo sector is a normal servo sector or a short servo sector (B3601). If the servo sector is determined to be a normal servo sector (normal servo sector of B3601), the system controller 130 adjusts the write data characteristic value, for example, the BPI during a time interval corresponding to the width of the normal servo sector (B3602), and ends the process. If the servo sector is determined to be a short servo sector (short servo sector B3601), the system controller 130 adjusts the write data characteristic value, for example, the BPI during a time interval corresponding to the width of the short servo sector which is less than the width of the normal servo sector (B3603), and ends the process.

According to the second embodiment, in the current normal sector of the access track, the magnetic disk device 1 sets the adjustment BPI or the adjustment capability of the current short sector based on the BER or the OW of the current short sector, and adjusts (corrects or sets) the current BPI or the current recording capability of the current short sector to the adjustment BPI or the adjustment capability before the time of reaching the data portion of the current short sector. The magnetic disk device 1 sets the adjustment BPI or the adjustment capability of the next normal sector based on the BER or the OW of the next normal sector in the current short sector, and adjusts (corrects or sets) the current BPI or recording capability of the next normal sector to the adjustment BPI or the adjustment capability before the time of reaching the data portion of the next normal sector. Therefore, the magnetic disk device 1 can improve access performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head which writes data to the disk and reads data from the disk; and
   a controller which increases a first recording density of data to be written to a first sector having a first overwrite in the first sector and reduces a second recording density of data to be written to a second sector having a second overwrite different from the first overwrite, on a first track of the disk,
   wherein the first recording density and a third recording density of data to be written to a third sector which is adjacent to the first sector on the first track are different from each other.

2. The magnetic disk device of claim 1, wherein the controller sets, in the first sector, the third recording density to the third sector.

3. The magnetic disk device of claim 1, wherein the controller sets the first recording density to the first sector during a time of seeking from a second track which is different from the first track to the first sector of the first track.

4. The magnetic disk device of claim 1, wherein the controller sets the third recording density to a fourth sector which is adjacent to the third sector on the first track and includes a second servo sector shorter than a first servo sector of the third sector.

5. The magnetic disk device of claim 1, wherein the controller sets, in the third sector, a fourth recording density which is different from the third recording density to a fourth sector which is adjacent to the third sector on the first track and includes a second servo sector shorter than a first servo sector of the third sector.

6. The magnetic disk device of claim 1, wherein the controller calculates a change of a recording density on the first track by sinusoidal approximation and stores the calculated change.

7. The magnetic disk device of claim 6, wherein the controller individually adjusts a phase, an amplitude and a period of the change of the recording density at a time of executing the sinusoidal approximation.

8. A magnetic disk device comprising:
   a disk;
   a head which writes data to the disk and reads data from the disk; and
   a controller which increase a first recording capability of data to be written to a first sector having a first overwrite which is lower than a reference value in the first sector and reduces a second recording capability of data to be written to a second sector having a second overwrite which is higher than the reference value, on a first track of the disk,
   wherein the first recording capability and a third recording capability of data to be written to a third sector which is adjacent to the first sector on the first track are different from each other.

9. The magnetic disk device of claim 8, wherein the controller sets the third recording capability to a fourth sector which is adjacent to the third sector on the first track and includes a second servo sector shorter than a first servo sector of the third sector.

10. The magnetic disk device of claim 8, wherein the controller sets, in the third sector, a fourth recording capability which is different from the third recording capability to a fourth sector which is adjacent to the third sector on the first track and includes a second servo sector shorter than a first servo sector of the third sector.

11. The magnetic disk device of claim 8, wherein the controller calculates a change of a recording capability on the first track by sinusoidal approximation and stores the calculated change.

12. The magnetic disk device of claim 8, wherein the controller synchronizes each of a timing for changing the first recording capability and a timing for changing the second recording capability with a timing at which a servo gate rises.

13. The magnetic disk device of claim 8, wherein each of the first recording capability and the second recording capability includes overshoot, 1T boost of pattern dependent write, high frequency assisted recording type bias voltage, and heat-assisted recording type bias voltage.

14. The magnetic disk device of claim 13, wherein the controller sets a third recording capability different from the first recording capability to a third sector which is adjacent to the first sector including a first servo sector on the first track and includes the first servo sector.

15. The magnetic disk device of claim 8, wherein the controller adjusts a second number of periods of a change of a recording capability on a second track located on an inner side with respect to the first track, which is greater than a first number of periods of a change of a recording capability on the first track.

* * * * *